US009432657B2

(12) United States Patent
Saito

(10) Patent No.: US 9,432,657 B2
(45) Date of Patent: Aug. 30, 2016

(54) NAKED-EYE STEREOSCOPIC DISPLAY APPARATUS, VIEWPOINT ADJUSTMENT METHOD, AND NAKED-EYE STEREOSCOPIC VISION-READY VIDEO DATA GENERATION METHOD

(71) Applicant: JVC KENWOOD CORPORATION, Yokohama-shi, Kanagawa (JP)

(72) Inventor: Atsushi Saito, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 423 days.

(21) Appl. No.: 13/928,451

(22) Filed: Jun. 27, 2013

(65) Prior Publication Data

US 2013/0293691 A1 Nov. 7, 2013

Related U.S. Application Data

(63) Continuation of application No. PCT/JP2012/062341, filed on May 15, 2012.

(30) Foreign Application Priority Data

May 27, 2011 (JP) .................................. 2011-118922
Mar. 26, 2012 (JP) .................................. 2012-068771
Mar. 26, 2012 (JP) .................................. 2012-068772

(51) Int. Cl.
*H04N 13/04* (2006.01)
*G02B 27/22* (2006.01)
(Continued)

(52) U.S. Cl.
CPC ...... *H04N 13/0404* (2013.01); *G02B 27/2214* (2013.01); *G09G 3/003* (2013.01);
(Continued)

(58) Field of Classification Search
CPC .................. G02B 27/2214; G09G 2320/0285; G09G 3/003; G09G 5/363; H04N 13/0022; H04N 13/0282; H04N 13/0404; H04N 13/0447; H04N 13/0468
USPC ............................................................. 348/50
See application file for complete search history.

(56) References Cited

U.S. PATENT DOCUMENTS 6,084,594 A * 7/2000 Goto ....................... G06F 3/147
345/427
6,549,650 B1 * 4/2003 Ishikawa ............. G02B 27/2264
345/419

(Continued)

FOREIGN PATENT DOCUMENTS

GB 2405546 A 3/2005
JP 06-148763 A 5/1994

(Continued)

*Primary Examiner* — Shan Elahi
(74) *Attorney, Agent, or Firm* — Nath, Goldberg & Meyer; Jerald L. Meyer; Stanley N. Protigal

(57) ABSTRACT

On a display device, a lenticular lens is arranged in a state where a periodic direction thereof is inclined with respect to the horizontal direction. Within a maximum predetermined viewing angle defined by two viewpoint images with the largest parallax, a viewpoint adjustment unit sets a first angular region where there is a high possibility that one or more eyes may be present when an observer observes the display device, and a second angular region where there is a low possibility that one or more eyes may be present. The viewpoint adjustment unit adjusts the viewpoints so that a parallax between adjacent viewpoint images in viewpoint images to be presented in the first angular region is reduced more than a parallax between adjacent viewpoint images in viewpoint images to be presented in the second angular region.

28 Claims, 17 Drawing Sheets

(51) Int. Cl.
*G09G 3/00* (2006.01)
*H04N 13/00* (2006.01)
*H04N 13/02* (2006.01)
*G09G 5/36* (2006.01)

(52) U.S. Cl.
CPC ...... *H04N13/0022* (2013.01); *H04N 13/0282* (2013.01); *H04N 13/0447* (2013.01); *H04N 13/0468* (2013.01); *G09G 5/363* (2013.01); *G09G 2320/0285* (2013.01)

(56) References Cited

U.S. PATENT DOCUMENTS

| | | | | |
|---|---|---|---|---|
| 2002/0191841 A1* | 12/2002 | Harman | ............... | H04N 19/597 382/154 |
| 2005/0264651 A1* | 12/2005 | Saishu | ............... | H04N 13/0011 348/51 |
| 2006/0023197 A1* | 2/2006 | Joel | ............... | G03B 35/24 355/77 |
| 2006/0192776 A1* | 8/2006 | Nomura | ............. | H04N 13/0022 345/419 |
| 2009/0244270 A1 | 10/2009 | Takagi et al. | | |
| 2010/0027113 A1* | 2/2010 | Shin | ............... | H04N 13/0404 359/463 |
| 2010/0315492 A1 | 12/2010 | Baik et al. | | |
| 2011/0102423 A1 | 5/2011 | Nam et al. | | |
| 2011/0228042 A1* | 9/2011 | Gao | ............... | G02B 27/2278 348/36 |
| 2011/0261050 A1* | 10/2011 | Smolic | ............... | G06T 15/20 345/419 |
| 2012/0019635 A1* | 1/2012 | Jian | ............... | H04N 13/0011 348/54 |
| 2012/0092455 A1* | 4/2012 | Tsai | ............... | H04N 13/0011 348/44 |
| 2012/0200677 A1* | 8/2012 | Saishu | ............... | G02B 27/225 348/51 |

FOREIGN PATENT DOCUMENTS

| | | |
|---|---|---|
| JP | 2005078076 A | 3/2005 |
| JP | 3940456 A | 7/2007 |
| JP | 2007-336002 A | 12/2007 |
| JP | 2009-237112 A | 10/2009 |
| JP | 2010-078883 A | 4/2010 |
| JP | 2010-171608 A | 8/2010 |
| JP | 2011-004388 A | 1/2011 |
| JP | 2011-101366 A | 5/2011 |
| WO | 2010/084716 A | 7/2010 |

* cited by examiner

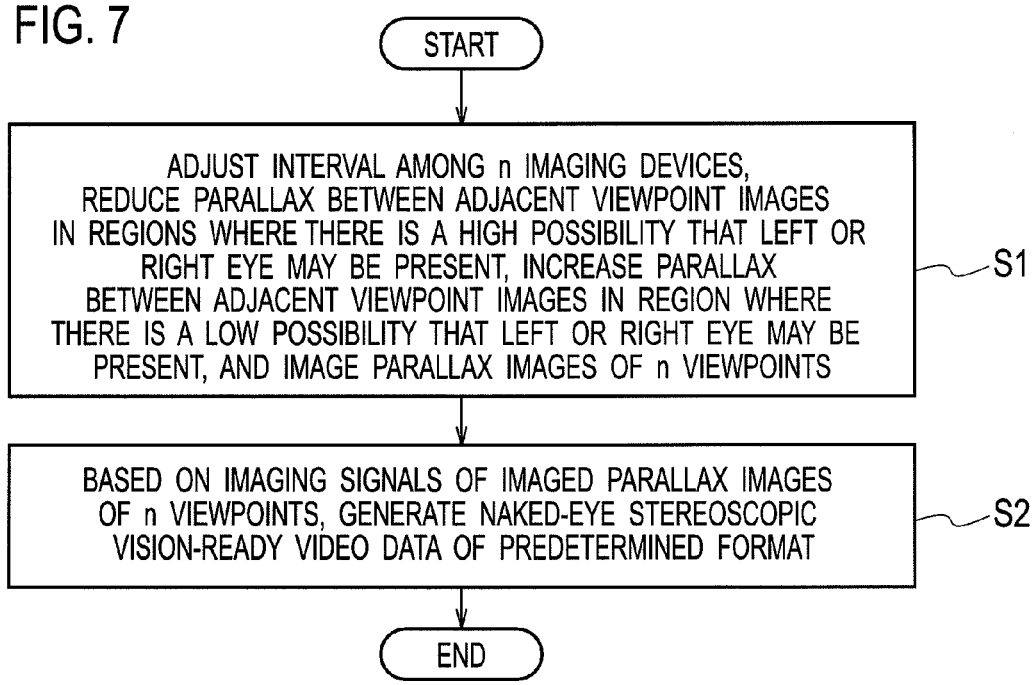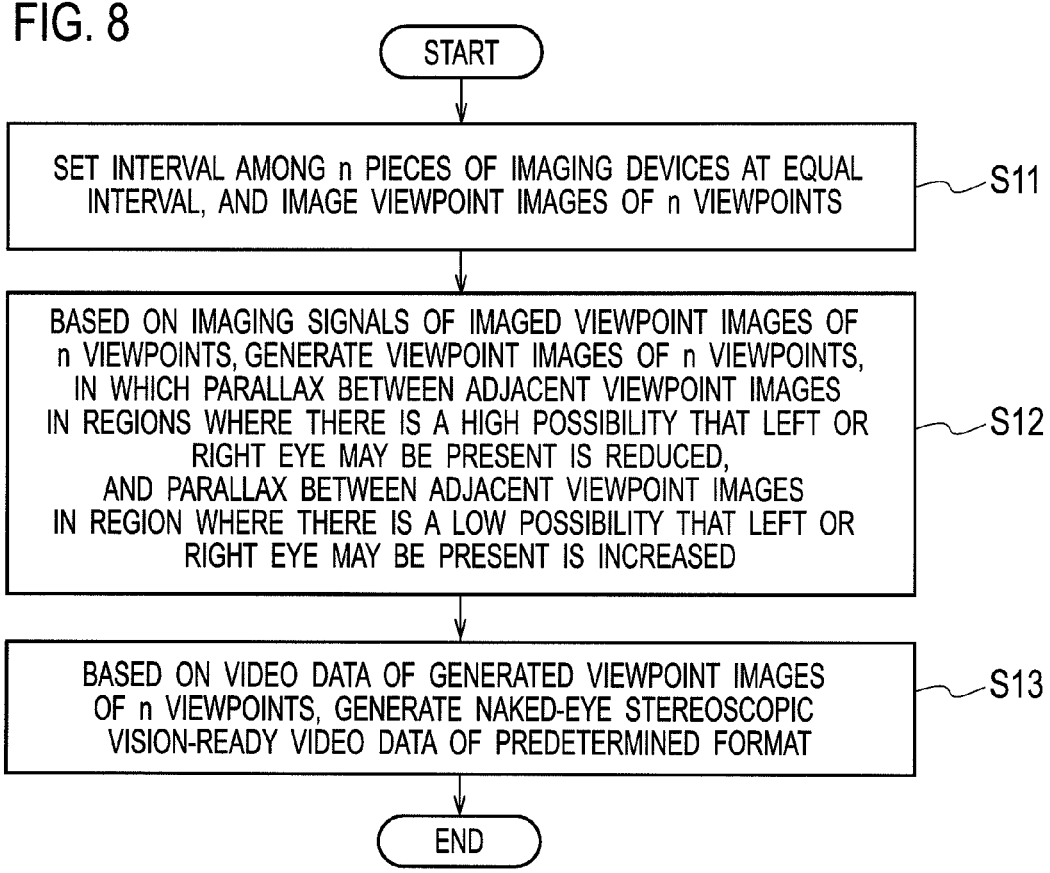

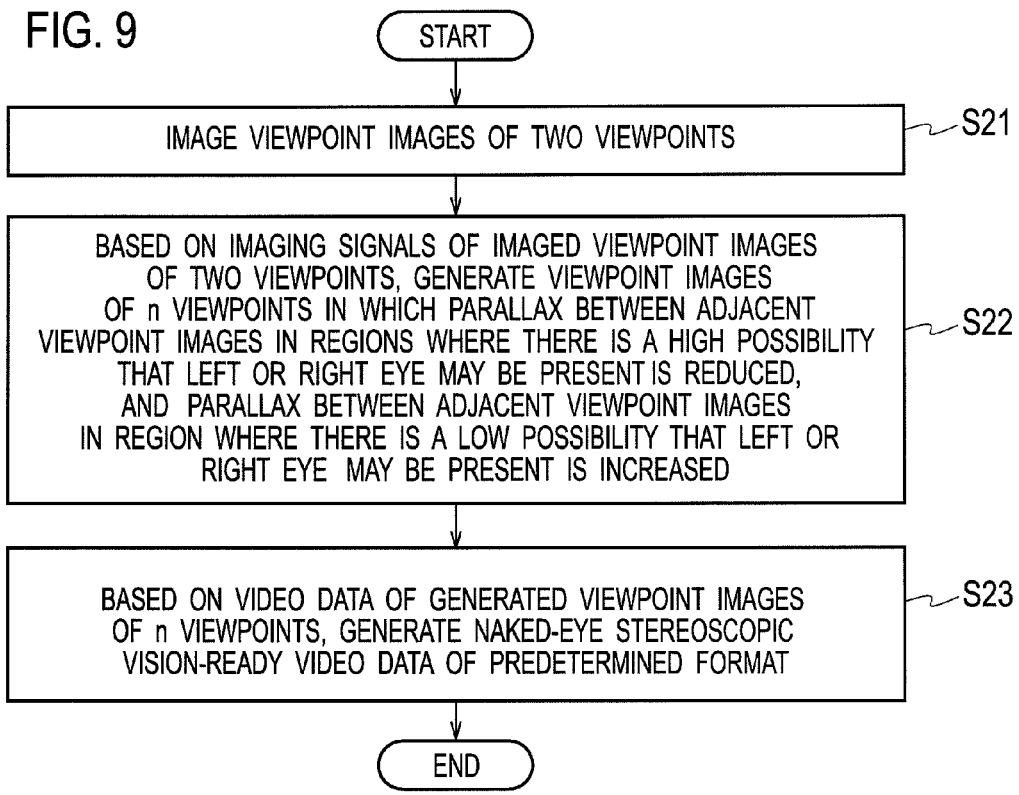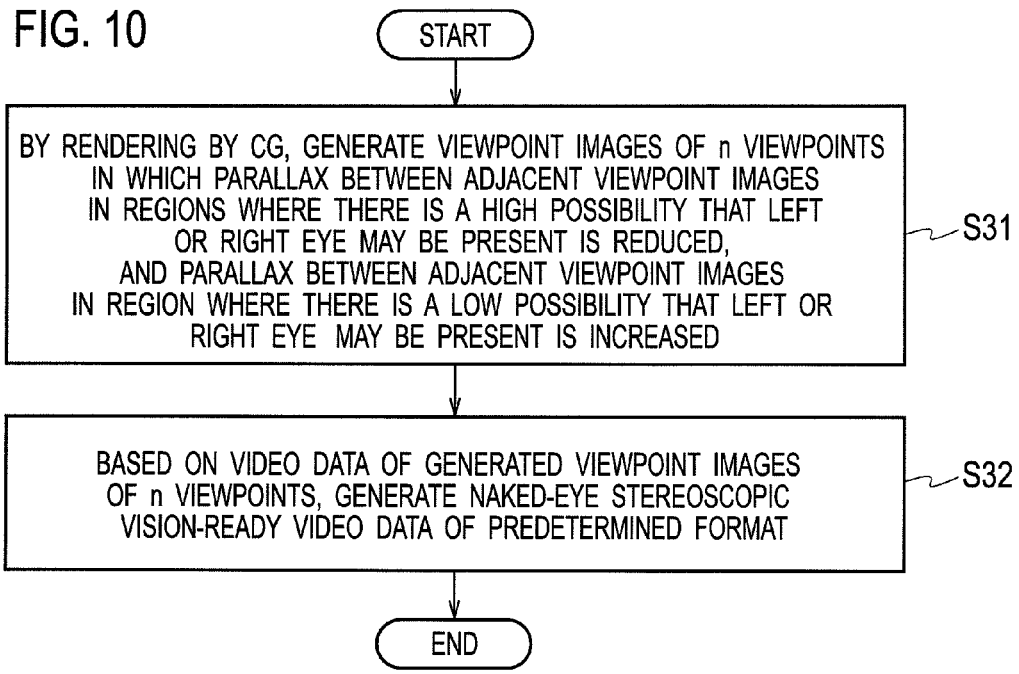

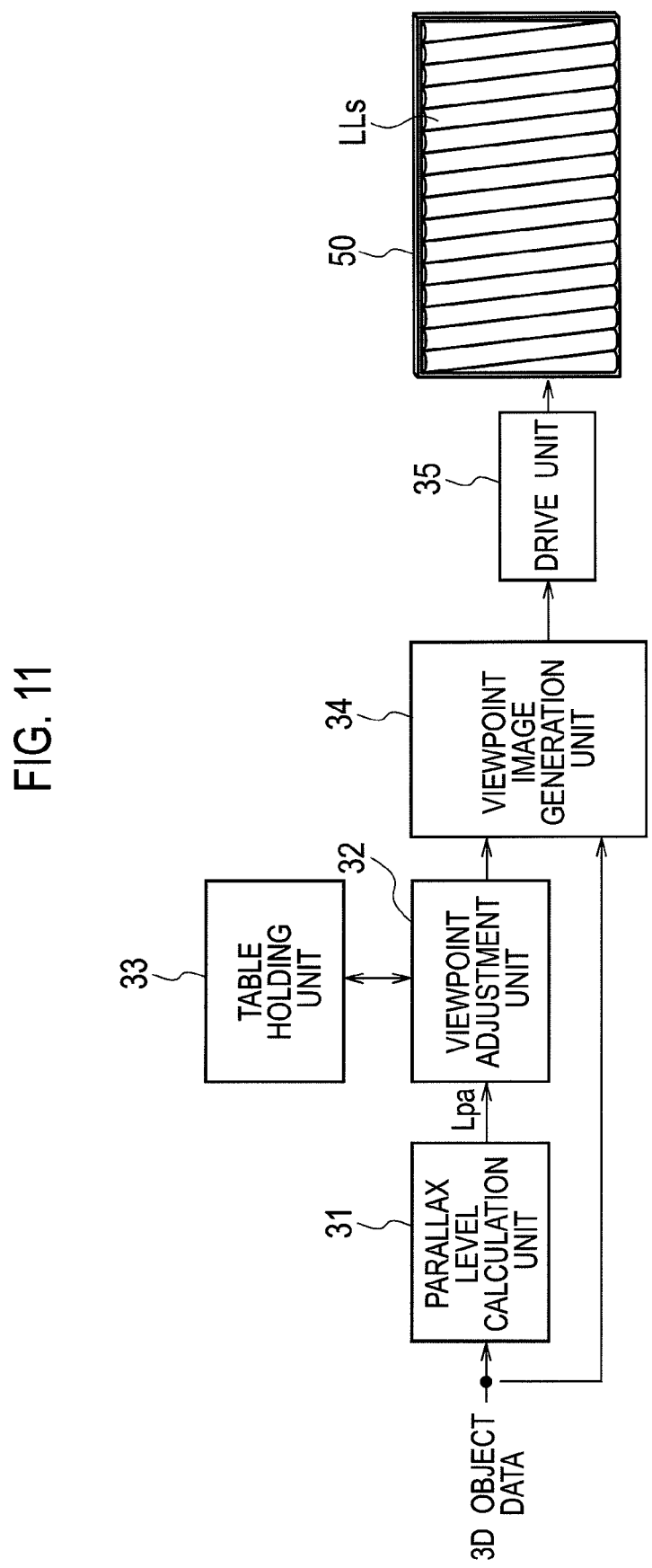

| VIEWPOINT NUMBER i | PRESENTATION DIRECTION $\theta_i[°]$ | $\phi_i[°]$ | | | POSSIBILITY THAT EYES MAY BE PRESENT |
|---|---|---|---|---|---|
| | | Lpa=0 | Lpa=1 | Lpa=2 | |
| 0 | 0 | 0 | 0 | 0 | HIGH |
| 1 | 3 | 2.5 | 1.5 | 0.5 | |
| 2 | 6 | 5 | 3.5 | 2 | |
| 3 | 9 | 8 | 6.5 | 5 | LOW |
| 4 | 12 | 12 | 12 | 12 | |
| 5 | 15 | 16 | 17.5 | 19 | |
| 6 | 18 | 19 | 20.5 | 22 | HIGH |
| 7 | 21 | 21.5 | 22.5 | 23.5 | |
| 8 | 24 | 24 | 24 | 24 | |

| VIEWPOINT NUMBER i | PRESENTATION DIRECTION $\theta_i[°]$ | NUMBER OF PARALLAX IMAGE TO BE PRESENTED | POSSIBILITY THAT EYES MAY BE PRESENT |
|---|---|---|---|
| 0 | 0 | 0 | HIGH |
| 1 | 3 | 1 | |
| 2 | 6 | 1 | |
| 3 | 9 | 2 | LOW |
| 4 | 12 | 4 | |
| 5 | 15 | 6 | |
| 6 | 18 | 7 | HIGH |
| 7 | 21 | 7 | |
| 8 | 24 | 8 | |

| VIEWPOINT NUMBER i | PRESENTATION DIRECTION $\theta$ i[°] | $\phi$ i[°] | POSSIBILITY THAT EYES MAY BE PRESENT |
|---|---|---|---|
| 0 | 0 | 0 | HIGH |
| 1 | 3 | 2.5 | |
| 2 | 6 | 5 | |
| 3 | 9 | 8 | LOW |
| 4 | 12 | 12 | |
| 5 | 15 | 16 | |
| 6 | 18 | 19 | HIGH |
| 7 | 21 | 21.5 | |
| 8 | 24 | 24 | |

FIG. 23

| VIEWPOINT NUMBER i | VIEWPOINT NUMBER i' |
|---|---|
| 0 | 4 |
| 1 | 5 |
| 2 | 6 |
| 3 | 7 |
| 4 | 8 |
| 5 | 0 |
| 6 | 1 |
| 7 | 2 |
| 8 | 3 |

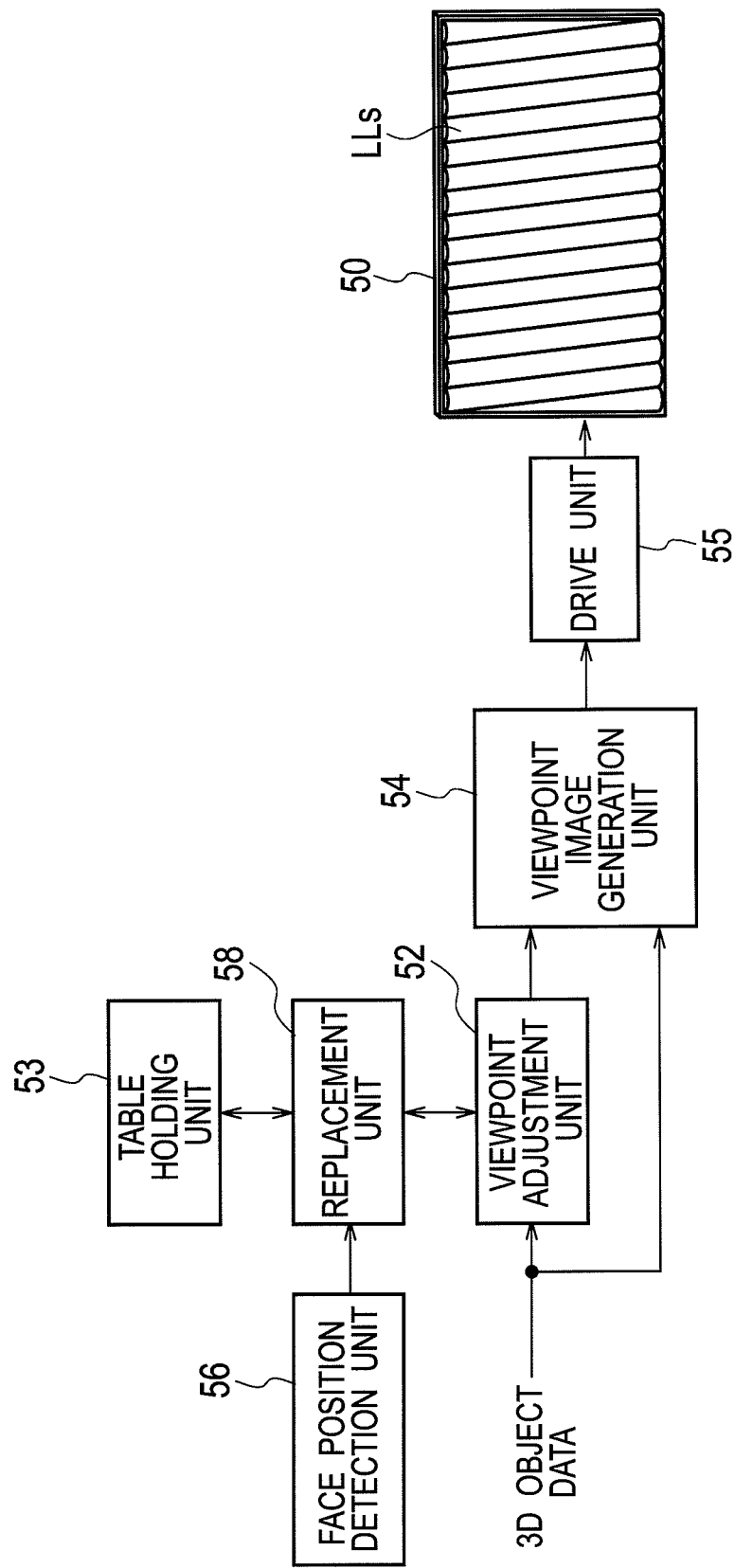

FIG. 25A

| VIEWPOINT NUMBER i | PRESENTATION DIRECTION $\theta_i[°]$ | $\phi_i[°]$ | POSSIBILITY THAT EYES MAY BE PRESENT |
|---|---|---|---|
| 0 | 0 | 0 | HIGH |
| 1 | 3 | 2.5 | HIGH |
| 2 | 6 | 5 | HIGH |
| 3 | 9 | 8 | LOW |
| 4 | 12 | 12 | LOW |
| 5 | 15 | 16 | LOW |
| 6 | 18 | 19 | HIGH |
| 7 | 21 | 21.5 | HIGH |
| 8 | 24 | 24 | HIGH |

FIG. 25B

| VIEWPOINT NUMBER i | VIEWPOINT NUMBER i' | PRESENTATION DIRECTION $\theta_i[°]$ | $\phi_i[°]$ | POSSIBILITY THAT EYES MAY BE PRESENT |
|---|---|---|---|---|
| 5 | 0 | 0 | 0 | HIGH |
| 6 | 1 | 3 | 2.5 | HIGH |
| 7 | 2 | 6 | 5 | HIGH |
| 8 | 3 | 9 | 8 | LOW |
| 0 | 4 | 12 | 12 | LOW |
| 1 | 5 | 15 | 16 | LOW |
| 2 | 6 | 18 | 19 | HIGH |
| 3 | 7 | 21 | 21.5 | HIGH |
| 4 | 8 | 24 | 24 | HIGH |

FIG. 27A

| VIEWPOINT NUMBER i | PRESENTATION DIRECTION $\theta_i[°]$ | $\phi_i[°]$ | | | POSSIBILITY THAT EYES MAY BE PRESENT |
|---|---|---|---|---|---|
| | | Fd:LARGE | Fd:MEDIUM | Fd:SMALL | |
| 0 | 0 | 0 | 0 | 0 | HIGH |
| 1 | 3 | 2.5 | 1.5 | 0.5 | |
| 2 | 6 | 5 | 3.5 | 2 | |
| 3 | 9 | 8 | 6.5 | 5 | LOW |
| 4 | 12 | 12 | 12 | 12 | |
| 5 | 15 | 16 | 17.5 | 19 | |
| 6 | 18 | 19 | 20.5 | 22 | HIGH |
| 7 | 21 | 21.5 | 22.5 | 23.5 | |
| 8 | 24 | 24 | 24 | 24 | |

FIG. 27B

| VIEWPOINT NUMBER i | VIEWPOINT NUMBER i' | PRESENTATION DIRECTION $\theta_i[°]$ | $\phi_i[°]$ | | | POSSIBILITY THAT EYES MAY BE PRESENT |
|---|---|---|---|---|---|---|
| | | | Fd:LARGE | Fd:MEDIUM | Fd:SMALL | |
| 5 | 0 | 0 | 0 | 0 | 0 | HIGH |
| 6 | 1 | 3 | 2.5 | 1.5 | 0.5 | |
| 7 | 2 | 6 | 5 | 3.5 | 2 | |
| 8 | 3 | 9 | 8 | 6.5 | 5 | LOW |
| 0 | 4 | 12 | 12 | 12 | 12 | |
| 1 | 5 | 15 | 16 | 17.5 | 19 | |
| 2 | 6 | 18 | 19 | 20.5 | 22 | HIGH |
| 3 | 7 | 21 | 21.5 | 22.5 | 23.5 | |
| 4 | 8 | 24 | 24 | 24 | 24 | |

NAKED-EYE STEREOSCOPIC DISPLAY APPARATUS, VIEWPOINT ADJUSTMENT METHOD, AND NAKED-EYE STEREOSCOPIC VISION-READY VIDEO DATA GENERATION METHOD

CROSS REFERENCE TO RELATED APPLICATION

This application is a Continuation of PCT Application No. PCT/JP2012/062341, filed on May 15, 2012, and claims the priority of Japanese Patent Application No. 2011-118922, filed on May 27, 2011, No. 2012-068771, filed on Mar. 26, 2012, and No. 2012-068772, filed on Mar. 26, 2012, the entire contents of all of which are incorporated herein by reference.

BACKGROUND

Embodiments relate to; a naked-eye stereoscopic display apparatus having a parallax in a single dimension, a viewpoint adjustment method for use in the event of displaying video data composed of a plurality of viewpoint images on the naked-eye stereoscopic display apparatus, and a naked-eye stereoscopic vision-ready video data generation method for generating naked-eye stereoscopic vision-ready video data to be displayed on the naked-eye stereoscopic display apparatus having the parallax in a single dimension.

There are known technologies in which an image displayed on a display device such as a printing surface or a liquid crystal panel is divided into a plurality of viewpoint directions and presented by using a special optical member such as a lenticular lens, a slit-like barrier or a lens array. Thereby, the displayed image changes according to the position of the viewer. As an example of one such technology, there is a technology for allowing the display image to be stereoscopically viewed in such a manner that different display images (parallax images) of the same object, which have a specific parallax therebetween, are inputted to the right eye and left eye of a person who views the display device. In accordance with this stereoscopic technology, a naked-eye stereoscopic display apparatus can be realized which enables the person to achieve stereoscopic vision without the need to wear special eyeglasses.

In the case of achieving stereoscopic vision of the image in the naked-eye stereoscopic display apparatus, there is a requirement that the number of viewpoints be increased by dividing the display image as finely as possible. This is in order to expand the visual recognition range in which stereoscopic vision can achieved, and to obtain natural stereoscopic vision and smooth motion parallax, which are worthy of long-time viewing. Recently, in a relatively low-resolution display device such as digital signage or a car navigation device, stereoscopic vision using parallax images has been performed for the purpose of enhancing visual attraction and visibility regarding stereoscopic information. However, as the number of viewpoints is increased, the resolution feeling is lowered. Note that it is defined that a value physically owned by the display device itself is the resolution, and that the extent of the resolution sensed by a person is the resolution feeling. Even in the case of achieving stereoscopic vision of the display image on the low-resolution display device, there is a requirement that natural stereoscopic vision be realized by suppressing the reduction of the resolution feeling as much as possible.

In order to satisfy these requirements a multi-eye type method is effective, in which the viewpoints are not divided by assuming positions of eyes of an observer who observes the display device, but instead viewpoints are divided as finely as possible, and the observer views the display device at any viewpoint among the finely divided viewpoints. In order to increase the number of parallax images, it is effective to increase the lens pitch with respect to the pixel pitch of the display device, for example, in the case where the optical member to be mounted on the display device is a lenticular lens. However, owing to the magnification effect of the lens, as the lens pitch increases color pixels look larger and accordingly, the resolution feeling of the parallax images in the pitch direction of the lens is significantly lowered. Then, a malfunction occurs in that the resolution feeling of the parallax images differs between the horizontal direction and the vertical direction. Note that the same shall also apply to the case of using an optical member such as a barrier.

As a technology for solving this malfunction, as described in Japanese Patent No. 3940456 (Patent Literature 1), it is described that the periodic direction of cylindrical lenses (optical elements) which compose the lenticular lens (optical member) is inclined with respect to the horizontal direction of the pixel array of the display device. In accordance with the technology described in Patent Literature 1, one three-dimensional image is composed by using not only the pixels in the horizontal direction but also the pixels in the vertical direction, whereby the lowering of the resolution feeling in the horizontal direction in the stereoscopic display can be suppressed, and the balance of the resolution feeling between the horizontal and vertical directions can be enhanced.

SUMMARY

However, in the case where the technology described in Patent Literature 1 is adopted, when greater depth and projection with respect to the surface of the display device are attempted to be expressed, there has been a problem that the resolution feeling deteriorates since the parallax between the viewpoint images adjacent to each other is increased.

It is an object of the embodiments to provide; a naked-eye stereoscopic display apparatus capable of suppressing the deterioration of the resolution feeling even in the case of expressing greater depth and projection with respect to the surface of the display device and capable of displaying a stereoscopic image with a high resolution feeling, a viewpoint adjustment method, and a naked-eye stereoscopic vision-ready video data generation method.

In order to solve the conventional technical problems mentioned above, a first aspect of the embodiments provides a naked-eye stereoscopic display apparatus comprising: a display device in which a plurality of pixels are arrayed in a horizontal direction and a vertical direction, whereby the display device assigns respective pixels of video data composed of a plurality of viewpoint images to the plurality of pixels, thereby displaying the respective pixels of pixel data; an optical member that has a plurality of optical elements periodically arrayed therein, arranged on the display device in a state where a periodic direction of the optical elements is inclined with respect to the horizontal direction of pixels in the display device, and configured to divide the plurality of viewpoint images displayed on the display device into a plurality of different viewpoint directions, and to present the divided viewpoint images; and a viewpoint adjustment unit which within a maximum predetermined viewing angle defined by two viewpoint images with the largest parallax, defines a first angular region in which there is a high possibility that a viewer's eyes may be present when observing the display device and a second angular region in which there is a low possibility that a viewer's eyes may be present, and which is configured to reduce the parallax between adjacent viewpoint images displayed in the first angular region more than the parallax between adjacent images in the second angular region.

A second aspect of the embodiments provides a viewpoint adjustment method comprising: setting, within a maximum predetermined viewing angle defined by two viewpoint images with the largest parallax, a first angular region in which there is a high possibility that one or more of a viewer's eyes may be present when observing a naked-eye stereoscopic display apparatus and a second angular region in which there is a low possibility that one or more eyes may be present; and adjusting the viewpoints so that a parallax between adjacent viewpoint images in viewpoint images to be presented in the first angular region are reduced more than a parallax between adjacent viewpoint images in viewpoint images to be presented in the second angular region.

A third aspect of the embodiments provides a naked-eye stereoscopic vision-ready video data generation method comprising: setting, within a maximum predetermined viewing angle defined by two viewpoint images with the largest parallax, a first angular region in which there is a high possibility that one or more eyes may be present when an observer observes a naked-eye stereoscopic display apparatus and a second angular region where there is a low possibility that one or more eyes may be present, and generating viewpoint images in which viewpoints are adjusted in advance so that a parallax between adjacent viewpoint images in viewpoint images to be presented in the first angular region is reduced more than a parallax between adjacent viewpoint images in viewpoint images to be presented in the second angular region; and formatting the viewpoint images, in which the viewpoints are adjusted in advance, into a predetermined format, and generating naked-eye stereoscopic vision-ready video data.

BRIEF DESCRIPTION OF THE DRAWINGS

FIG. 7 is a flowchart showing a first example in the naked-eye stereoscopic vision-ready video data generation method in one embodiment.

FIG. 8 is a flowchart showing a second example in the naked-eye stereoscopic vision-ready video data generation method in one embodiment.

FIG. 9 is a flowchart showing a third example in the naked-eye stereoscopic vision-ready video data generation method in one embodiment.

FIG. 10 is a flowchart showing a fourth example in the naked-eye stereoscopic vision-ready video data generation method in one embodiment.

FIG. 11 is a block diagram showing a naked-eye stereoscopic display apparatus of the first embodiment.

FIG. 23 is a diagram showing an example of shifting the viewpoint images so as to allow the viewpoint images to correspond to the offset of the position of the observer's face.

FIG. 24 is a block diagram showing a naked-eye stereoscopic display apparatus of a fourth embodiment.

FIG. 25A is a diagram showing an example of a parallax image presentation direction setting table held by a table holding unit 53 of FIG. 24.

FIG. 25B is a diagram showing a parallax image presentation direction replacement table in which viewpoint numbers of the parallax image presentation direction setting table shown in FIG. 25A are replaced by a replacement unit 58 of FIG. 24.

FIG. 27A is a diagram showing an example of a parallax image presentation direction setting table held by a table holding unit 63 of FIG. 26.

FIG. 27B is a diagram showing a parallax image presentation direction replacement table in which viewpoint numbers of the parallax image presentation direction setting table shown in FIG. 27A are replaced by a replacement unit 68 of FIG. 26.

DETAILED DESCRIPTION

A description is made below of one embodiment of a naked-eye stereoscopic display apparatus, a viewpoint adjustment method and a naked-eye stereoscopic vision-ready video data generation method with reference to the accompanying drawings. First, by using FIG. 1, a description follows of reasons why an image is visually recognized so as to be seen to overlap in a multi-eye type naked-eye stereoscopic display apparatus.

Figure 1A:
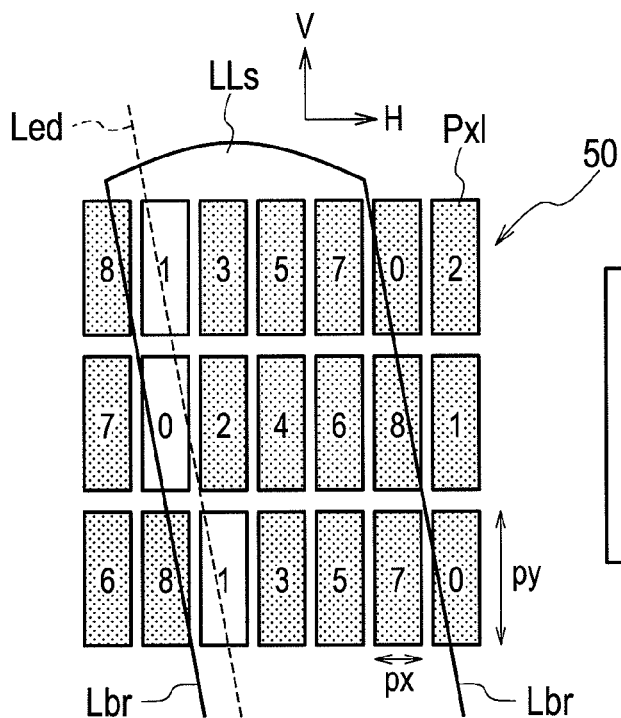
FIG. 1A is a view showing a configuration example of a naked-eye stereoscopic display apparatus capable of displaying a video with nine viewpoints.

FIG. 1A is a configuration example of a naked-eye stereoscopic display apparatus capable of displaying a video with nine viewpoints, which are viewpoints 0 to 8. In FIG. 1A, on a display device 50, a plurality of pixels Pxl are arrayed in horizontal (H) and vertical (V) directions. Numerals added to the pixels Pxl denote which viewpoint image each of the pixels Pxl displays. Here, only one cylindrical lens is shown; however in reality, on the plurality of arrayed pixels Pxl, a lenticular lens LLs is arranged in a state where the periodic direction of the cylindrical lenses is inclined with respect to the horizontal direction of the array of the pixels Pxl. The periodic direction of the cylindrical lenses (lenticular lens LLs) is a direction perpendicular to boundary lines Lbr between the cylindrical lenses.

In the case of assuming that there are no black stripes, the pixel pitch in the horizontal direction of the pixels Pxl is px, and the pixel pitch in the vertical direction thereof is py. The lens pitch in the horizontal direction of the lenticular lens LLs becomes 4.5 px, and the inclination angle thereof becomes $\tan^{-1}$ (px/2py).

Figure 1B:
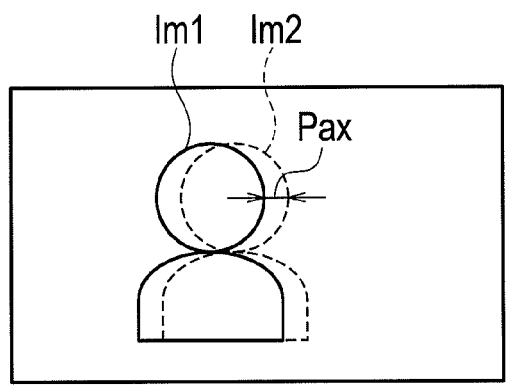
FIG. 1B is a view showing that images are displayed so as to overlap each other when the naked-eye stereoscopic display apparatus of FIG. 1A is viewed from a certain position.

In the case where the naked-eye stereoscopic display apparatus (display device 50) of FIG. 1A is viewed from a certain position, only the pixels Pxl present on a straight line Led (which is shown by a broken line at an equal distance from each of the boundary lines Lbr of the cylindrical lenses), are seen. The pixels Pxl seen on the straight line Led are shown in white, and other pixels Pxl are shown with a texture pattern. As understood from FIG. 1A, an image of the viewpoint 0 and an image of the viewpoint 1 are seen. Therefore, as shown in FIG. 1B, a viewpoint image Im1 and a viewpoint image Im2 are visually recognized to overlap each other. A parallax Pax is present between the viewpoint image Im1 and the viewpoint image Im2. In the case where the parallax Pax is large, an image which is largely blurred left and right is formed, and the resolution feeling in the horizontal direction deteriorates.

In a multi-eye type naked-eye stereoscopic display apparatus using the lenticular lens LLs, the visual recognition range can be widened as the lens pitch is increased and the focal length is shortened. However, the resolution deteriorates. Accordingly, in general, in consideration of a balance between the visual recognition range and the resolution, the visual recognition range is set at ±10 to 15° in the horizontal direction with respect to a straight line perpendicular to the screen surface of the naked-eye stereoscopic display apparatus.

Figure 2:
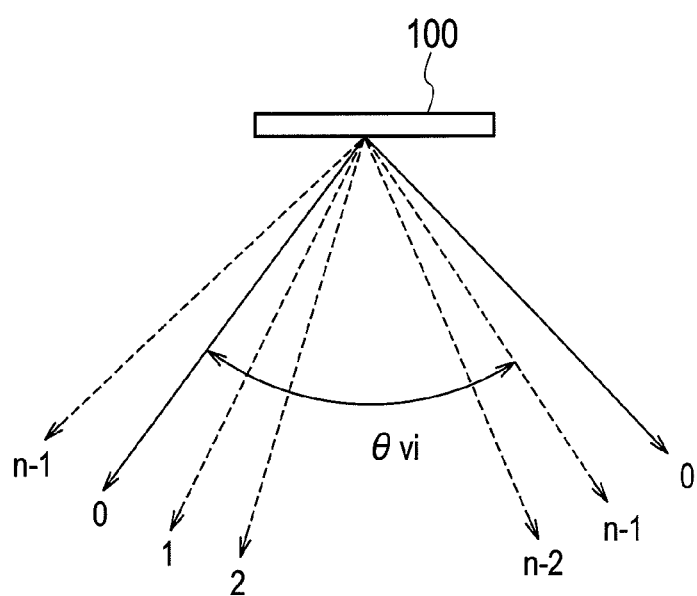
FIG. 2 is a view for explaining presentation directions of viewpoint images.

In FIG. 2, arrow lines extended from a naked-eye stereoscopic display apparatus 100 indicate presentation directions of the viewpoint images. Reference numerals added to the respective presentation directions denote numbers indicating the respective viewpoint images. As shown in FIG. 2, in the naked-eye stereoscopic display apparatus 100 that divides n viewpoint images into n different viewpoint directions and presents the viewpoint images, a visual recognition range θvi is defined by the angle made between the direction of presenting the viewpoint image 0 and the direction of presenting the viewpoint image n−1. The naked-eye stereoscopic display apparatus 100 has the display device 50 and the lenticular lens LLs in FIG. 1.

Figure 3A:
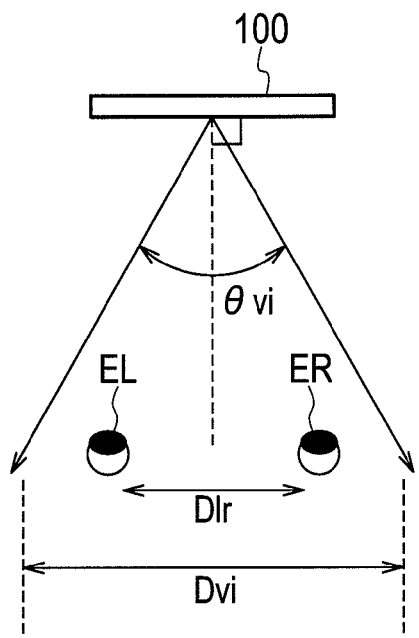
FIG. 3A and FIG. 3B are views for explaining relationships between the naked-eye stereoscopic display apparatus and positions of observer's eyes.
Figure 3B:
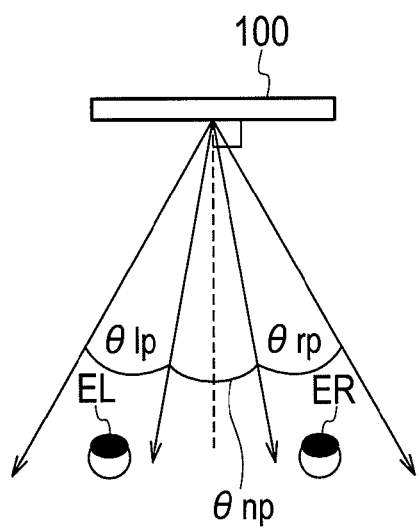

In the case where the observer attempts to see a stereoscopic image from near the naked-eye stereoscopic display apparatus 100, it is anticipated that positions of observer's eyes are substantially located at positions shown in FIG. 3A. The distance (interocular distance) Dlr between the right eye ER and left eye EL of the observer is not much different from the visually recognizable width Dvi, and accordingly, as shown in FIG. 3B, there exist: an angular region θlp where there is a high possibility that the left eye may be present on the left side in the visual recognition range θvi; and an angular region θrp where there is a relatively high possibility that the right eye may be present on the right side in the visual recognition range θvi. At the center of the visual recognition range θvi, an angular region θnp exists where there is a relatively low possibility that either of the left eye or the right eye may be present.

Figure 4:
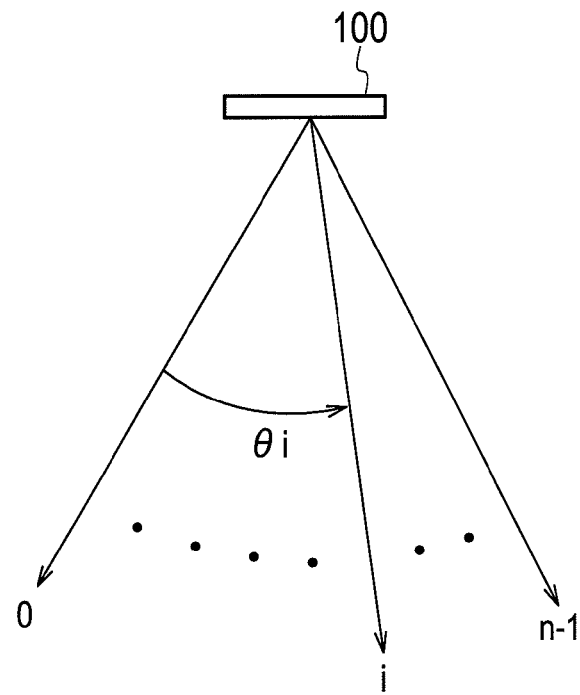
FIG. 4 is a view for explaining usual presentation directions of the viewpoint images.

FIG. 4, shows the usual presentation directions in the event where the naked-eye stereoscopic display apparatus 100 divides the n pieces of viewpoint images into n directions and presents the view point images. The direction of presenting the viewpoint image 0 is taken as a reference and an angle therefrom to the direction of presenting the viewpoint image i is defined as θi. The angle θi is proportional to the number i of the viewpoint image. As described above, usually the directions of presenting the n viewpoint images are set at directions separated by an equal angle. In this embodiment, in order to solve the conventional technical problems mentioned above, the parallax between adjacent viewpoint images is reduced in the angular region θlp where there is a high possibility that the left eye may be present and the angular region θrp where there is a high possibility that the right eye maybe present, and the parallax between adjacent viewpoint images is increased in the angular region θnp where there is a low possibility that either of the left eye or the right eye may be present.

Note that, in FIG. 3A, when the observer observes the naked-eye stereoscopic display apparatus 100 from further away, the visually recognizable width Dvi becomes larger than the interocular distance Dlr, and the possibility that the left eye may be present in the visually recognizable width Dvi and that the right eye maybe present in the visually recognizable width Dvi becomes small. As the observation distance increases, the observer becomes more insensitive to the deterioration of the resolution feeling, and accordingly, the above-described method of differentiating the parallax between the adjacent viewpoint pixels is effective irrespective of the observation distance. Moreover, although the parallax between the adjacent viewpoint images is differentiated, whereby the motion parallax differs from the actual one; a key feature of depth of stereoscopic images is that binocular parallax is dominant. Accordingly, no particular problem occurs.

In terms of finding a method for adjusting the parallax between adjacent viewpoint images, a number of options are available. Firstly, the parallaxes can be set as required at the time of imaging the n viewpoint images. Alternatively, when using the standard method of imaging the n viewpoint images, video signal processing can be used to adjust the parallax between adjacent viewpoint images. Moreover, it is also possible to use just two viewpoint images and generate video data of the n different viewpoint images, by using video signal processing based on the data of the two viewpoint images. Furthermore, it is also possible to use a method where no imaging devices are used and instead, the data is rendered by computer graphics (CG).

<One Embodiment of Naked-Eye Stereoscopic Vision-Ready Video Data Generation Method>

Here, as one embodiment of the naked-eye stereoscopic vision-ready video data generation method, a method of adjusting the parallax between adjacent viewpoint images at the time of imaging the n viewpoint images, is described.

Figure 5A:
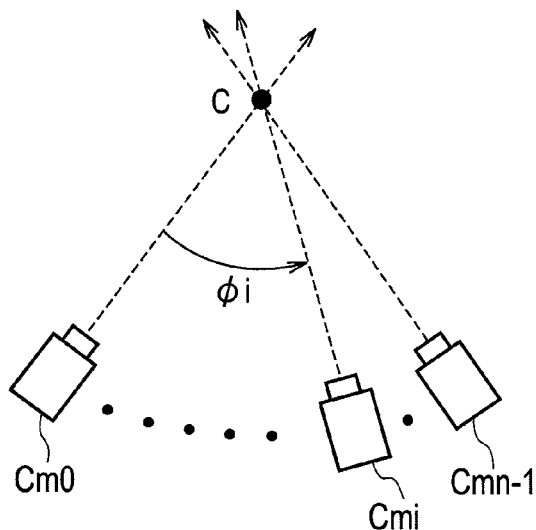
FIG. 5A is a view for explaining a usual imaging method in the case of imaging a plurality of the viewpoint images by a plurality of imaging devices, and is a view showing an example where the imaging devices are arranged in a circular arc shape about a clipping point taken as the center.
Figure 5B:
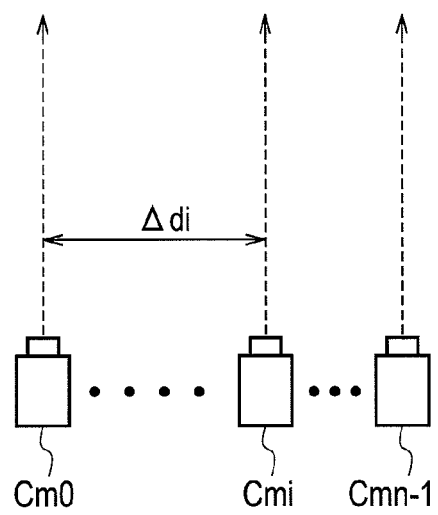
FIG. 5B is a view for explaining a usual imaging method in the case of imaging the plurality of viewpoint images by the plurality of imaging devices, and is a view showing an example where the imaging devices are arranged so that infinity can become the clipping point.

First, for comparison, the standard way of imaging is shown in FIG. 5A and FIG. 5B. As shown in FIG. 5A, n imaging devices Cm0 to Cmn−1 are arrayed at an equal distance and an equal angle interval in a circular arc shape about a clipping point C taken as center. The imaging device Cm0 is an imaging device that images the image of the viewpoint 0, the imaging device Cmi is an imaging device that images the image of the viewpoint i, and the imaging device Cmn−1 is an imaging device that images the image of the viewpoint n−1. When it is defined that ($\phi$i is the angle from the imaging direction of the viewpoint 0 by the imaging device Cm0 to the imaging direction of the viewpoint i by the imaging device Cmi, the angle $\phi$i is proportional to the angle θi described with reference to FIG. 4.

FIG. 5B shows an imaging method of the n viewpoint images in the case where the clipping point is set at infinity. When it is defined that Δdi is the distance between the imaging device Cm0 that images the image of the viewpoint 0 and the imaging device Cmi that images the image of the viewpoint i, the distance Δdi is proportional to i.

Figure 6A:
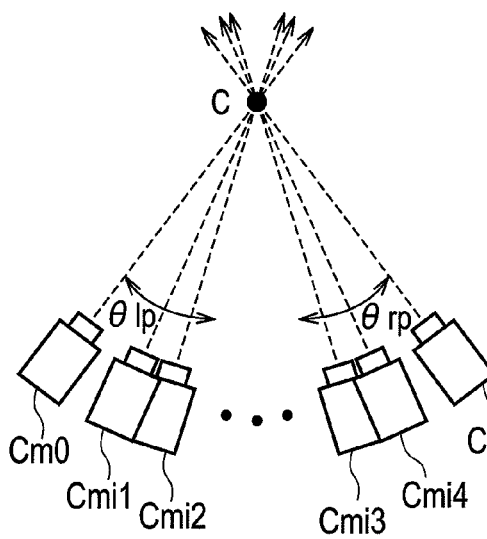
FIG. 6A and FIG. 6B are views for explaining an imaging method for use in a naked-eye stereoscopic vision-ready video data generation method of an embodiment.
Figure 6B:
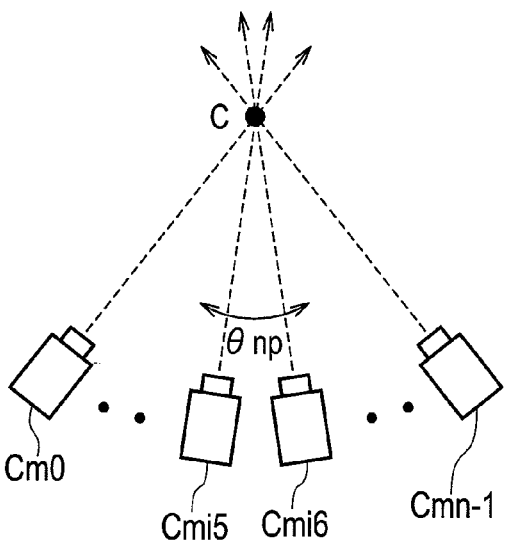

FIG. 6A and FIG. 6B, describe an alternative imaging arrangement for adjusting the parallax between adjacent viewpoint pixels. In a similar way to FIG. 5A, FIG. 6A and FIG. 6B show imaging methods in the case where the imaging devices Cm0 to Cmn−1 are arrayed in the circular arc shape about the clipping point C taken as center. In a similar way to FIG. 5B, it is also possible to set the clipping point at infinity; however, only the case where the imaging devices Cm0 to Cmn−1 are arrayed in the circular arc shape, is described here.

In FIG. 6A, the imaging devices Cmi1 and Cmi2 are imaging devices located in the angular region θlp where there is a high possibility that the left eye may be present, the angular region θlp having been described with reference to FIG. 3B. The imaging devices Cmi3 and Cmi4 are imaging devices located in the angular region θrp where there is a high possibility that the right eye may be present, the angular region θrp having been described with reference to FIG. 3B.

As shown in FIG. 6A, the interval between the imaging devices Cmi1 and Cmi2 located in the angular region θlp where there is a high possibility that the left eye may be present, and the interval between the imaging devices Cmi3 and Cmi4 located in the angular region θrp where there is a high possibility that the right eye may be present, are narrowed in comparison with the case of arranging the n pieces of imaging devices Cm0 to Cmn−1 at an equal angle interval as in FIG. 5A. Here, in each of the angular regions θlp and θrp, only two imaging devices are used; however, in the case where a larger number of imaging devices exist in each of the angular regions θlp and θrp, the interval among the respective imaging devices in each thereof needs to be narrowed.

Meanwhile, in FIG. 6B, the imaging devices Cmi5 and Cmi6 are imaging devices located in the angular region θnp where there is a low possibility that either the left eye or the right eye may be present, the angular region θnp having been described with reference to FIG. 3B. As shown in FIG. 6B, the interval between the imaging devices Cmi5 and Cmi6 located in the angular region θnp where there is a low possibility that either of the left eye or the right eye may be present, is widened in comparison with the case of arranging the n pieces of imaging devices Cm0 to Cmn−1 at an equal angle interval as in FIG. 5A. Here, only two imaging devices are used; however, in the case where a larger number of the imaging devices exist in the angular regions θnp, the interval among the respective imaging devices needs to be widened.

In this embodiment, as an example, the imaging is performed as in FIG. 6A and FIG. 6B, whereby the parallax between the adjacent viewpoint images is reduced in the angular region θlp where there is a high possibility that the left eye may be present and in the angular region θrp where there is a high possibility that the right eye may be present, in comparison with the case where the present invention is not applied. In contrast, the parallax between the adjacent viewpoint images is increased in the angular region θnp where there is a low possibility that either the left eye or the right eye may be present, in comparison with the case where the present invention is not applied.

FIG. 7 to FIG. 10 describe respective examples of the naked-eye stereoscopic vision-ready video data generation method of this embodiment. FIG. 7 shows a video data generation method in the case of imaging the n viewpoint images in such a manner as shown in FIG. 6A and FIG. 6B.

In FIG. 7, in Step S1, the interval among the n imaging devices Cm0 to Cmn−1 is adjusted, the parallax between the adjacent viewpoint images in the regions where there is a high possibility that the left and right eyes may be present is reduced, the parallax between the adjacent viewpoint images in the region where there is a low possibility that the left or right eye may be present is increased, and parallax images of n viewpoints are imaged.

Next, in Step S2, based on imaging signals of the imaged parallax images of the n viewpoints, the parallax images concerned are formatted into a predetermined format, and naked-eye stereoscopic vision-ready video data is generated. The format of the naked-eye stereoscopic vision-ready video data may be that of any of a line-by-line method, a side-by-side method, and a frame sequential method, a multi-viewpoint-ready format that conforms to these, or the like.

If the naked-eye stereoscopic vision-ready video data generated in Step S2 is inputted to and displayed on the naked-eye stereoscopic display apparatus 100 that has the display device 50 and the lenticular lens LLs as described with reference to FIG. 1, then a stereoscopic image with a high resolution feeling can be formed even in the case of expressing greater depth and projection.

FIG. 8 is an example of using the standard method of imaging the n viewpoint images, and generating the video data in which the parallax between adjacent viewpoint images is adjusted by the video signal processing.

In FIG. 8, in Step S11, the interval among the n pieces of imaging devices Cm0 to Cmn−1 is set at an equal interval, and the parallax images of then viewpoints are imaged. Next, in Step S12, by using a video signal processing device, based on the imaging signals of the imaged parallax images of the n viewpoints, alternative parallax images of the n viewpoints are generated, in which the parallax between adjacent viewpoint images in the regions where there is a high possibility that the left or right eye may be present is reduced, and the parallax between adjacent viewpoint images in the region where there is a low possibility that the left or right eye may be present is increased.

Then, in Step S13, based on the video data of the generated parallax images of the n viewpoints, the parallax images concerned are formatted into a predetermined format, and naked-eye stereoscopic vision-ready video data is generated. As for the video signal processing device used in Step S12, a publicly known device using a parallax map and the like can be used, and accordingly, a detailed description is not provided here. If the naked-eye stereoscopic vision-ready video data generated in Step S13 is inputted to and displayed on the naked-eye stereoscopic display apparatus 100, then similar effects to those in the case of FIG. 7 can be obtained.

FIG. 9 is an example of imaging two viewpoint images, and generating the video data of the n viewpoint images, in which the parallax between the adjacent viewpoint images is calculated by the video signal processing based on the data of the two viewpoint images.

In FIG. 9, in Step S21, the parallax images of two viewpoints are imaged by using two imaging devices. Next, in Step S22, by using a video signal processing device, based on the imaging signals of the imaged parallax images of the two viewpoints, parallax images of the n viewpoints are generated, in which the parallax between the adjacent viewpoint images in the regions where there is a high possibility that the left or right eye may be present is reduced, and the parallax between the adjacent viewpoint images in the region where there is a low possibility that the left or right eye may be present is increased.

Then, in Step S23, based on the video data of the generated parallax images of the n viewpoints, the parallax images concerned are formatted into a predetermined format and naked-eye stereoscopic vision-ready video data is generated. As for the video signal processing device used in Step S22, a publicly known device that generates an intermediate viewpoint image by using the parallax map and the like can be used. If the naked-eye stereoscopic vision-ready video data generated in Step S23 is inputted to and displayed on the naked-eye stereoscopic display apparatus 100, then similar effects to those in the case of FIG. 7 can be obtained.

FIG. 10 is an example of realizing the naked-eye stereoscopic vision-ready video data generation method not by actually performing the imaging by imaging devices, but by rendering of 3D object data by CG. Note that the 3D object data contains information such as aggregated data of vertex coordinates, which is necessary to restore a three-dimensional shape of an object to be rendered.

In FIG. 10, in Step S31, by the rendering of the 3D object data by CG, the parallax images of the n viewpoints are generated, in which the parallax between the adjacent viewpoint images in the regions where there is a high possibility that the left or right eye may be present is reduced, and the parallax between the adjacent viewpoint images in the region where there is a low possibility that the left or right eyes may be present is increased.

Next, in Step S32, based on the video data of the generated parallax images of the n viewpoints, naked-eye stereoscopic vision-ready video data in a predetermined format is generated. If the naked-eye stereoscopic vision-ready video data generated in Step S32 is inputted to and displayed on the naked-eye stereoscopic display apparatus 100, then similar effects to those in the case of FIG. 7 can be obtained.

<First Embodiment of Naked-Eye Stereoscopic Display Apparatus and Viewpoint Adjustment Method>

Next, FIG. 11 describes a first embodiment of the naked-eye stereoscopic display apparatus and the viewpoint adjustment method. As an example, the naked-eye stereoscopic display apparatus of this embodiment receives 3D object data capable of being rendered by CG. The naked-eye stereoscopic display apparatus of this embodiment is configured so as to render and display the 3D object data so that the parallax between adjacent viewpoint images can be adjusted.

In FIG. 11, the 3D object data is inputted to a parallax level calculation unit 31 and a viewpoint image generation unit 34. A specific configuration of the display device 50 is as described with reference to FIG. 1A. The lenticular lens LLs is arranged on the display device 50. The different viewpoint images 0 to 8 shown in FIG. 1A will be visually recognized by the lenticular lens LLs. First, FIG. 12 describes presentation directions of the viewpoint images in the case where the 3D object data is rendered without implementing processing according to this embodiment, which will be described later, and displaying the viewpoints images of nine viewpoints on the display device 50.

Figure 12:
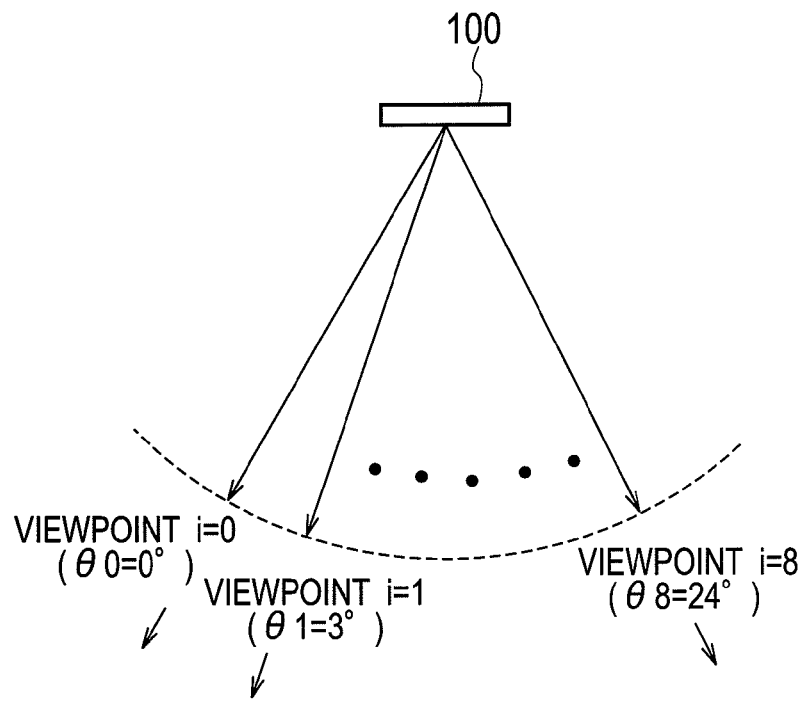
FIG. 12 is a view for explaining usual presentation directions in a case of presenting viewpoint images of nine viewpoints.

As shown in FIG. 12, the viewpoint image in which the viewpoint i is 0 (viewpoint image 0) is presented from the naked-eye stereoscopic display apparatus 100 in a direction of 0° as θ0. The naked-eye stereoscopic display apparatus 100 includes the display device 50 and the lenticular lens LLs in FIG. 11. Here, if it is assumed that the visual recognition range θvi is 24°, then the viewpoint image in which the viewpoint i is 8 (viewpoint image 8) is presented from the naked-eye stereoscopic display apparatus 100 in a direction of 24° as θ8. The viewpoint images between the viewpoint image 0 and the viewpoint image 8 are presented at intervals of 3°. For example, the viewpoint image in which the viewpoint i is is presented from the naked-eye stereoscopic display apparatus 100 in a direction of 3° as θ1.

Figure 13:
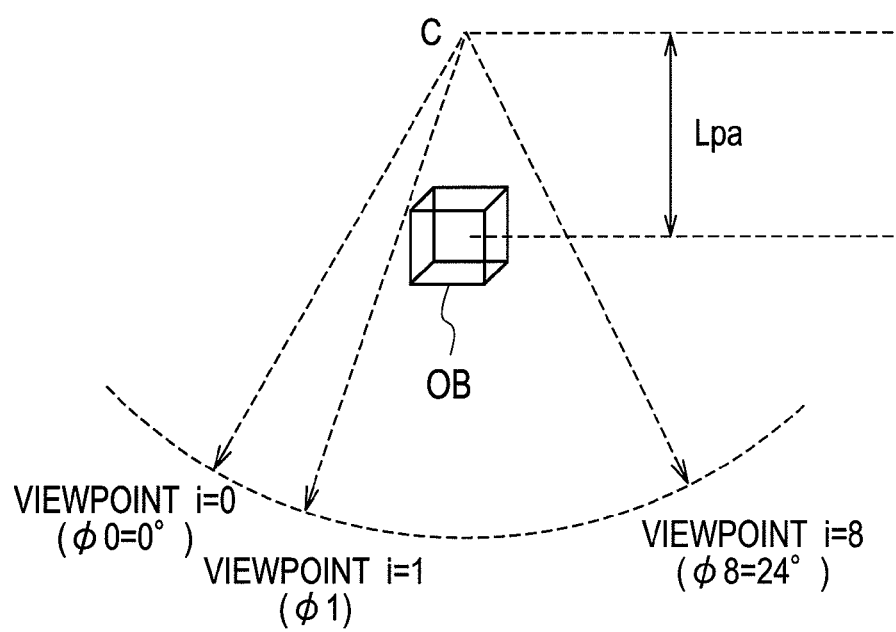
FIG. 13 is a view for explaining calculation of a parallax level by a parallax level calculation unit 31 of FIG. 11.

Returning to FIG. 11, there follows a description of operations of the naked-eye stereoscopic display apparatus of this embodiment. The parallax level calculation unit 31 calculates a parallax level Lpa from the distance between the clipping point C and the 3D object. As shown in FIG. 13, upon receiving the 3D object data, the parallax level calculation unit 31 arranges an object OB on a world coordinate system. The parallax level calculation unit 31 calculates the distance between the clipping point C and the gravity center coordinate of the object OB, and calculates the parallax level Lpa. For example, the parallax level Lpa is classified into three stages of 0 to 2. The parallax level Lpa is inputted to a viewpoint adjustment unit 32. Note that the calculation method of the parallax level is not limited to this method, and another method, for example, attaching the parallax level as header information to the inputted 3D object data is also conceivable.

Figures 14, 15:
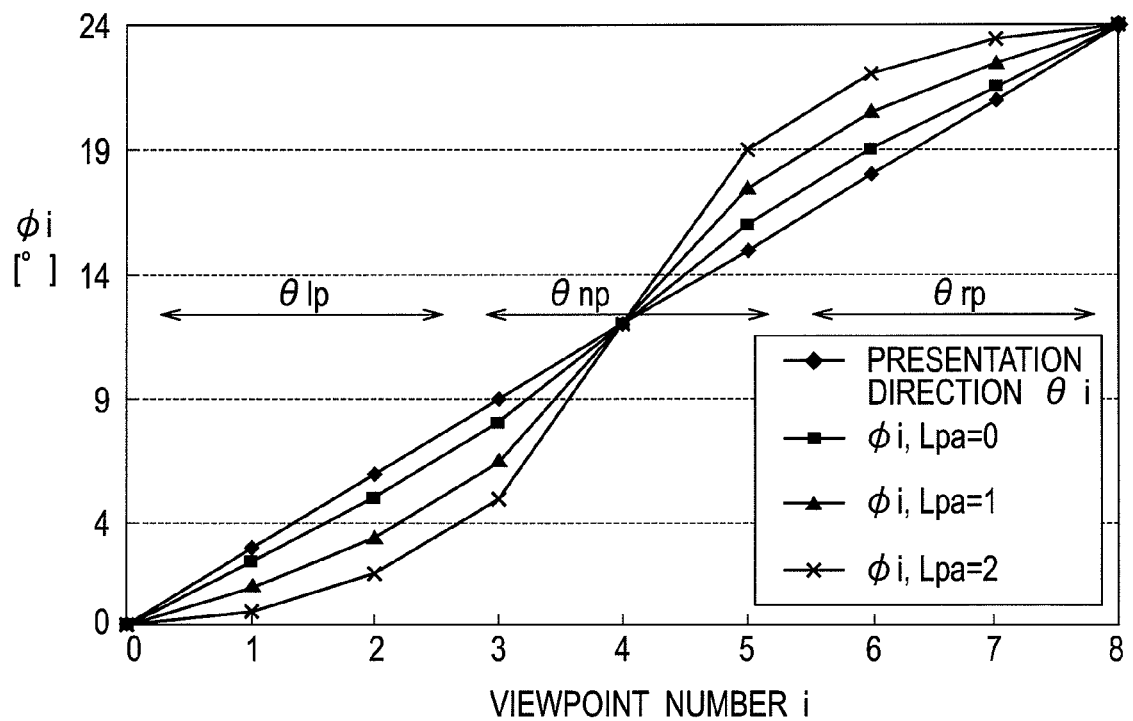
FIG. 14 is a diagram showing an example of a parallax image presentation direction setting table held by a table holding unit 33 of FIG. 11.
FIG. 15 is a characteristic chart for explaining functions and effects by the naked-eye stereoscopic display apparatus of the first embodiment.

In a table holding unit 33, a parallax image presentation direction setting table shown in FIG. 14 is held. As shown in FIG. 14, in the parallax image presentation direction setting table, sets of angles corresponding to the parallax levels Lpa 0 to 2 are set as angles φi indicating the directions of the imaging devices which render the 3D object. Here, the parallax level Lpa is classified into 3 stages, and the sets of the angles φi are defined to be three sets; however, the parallax level and the sets of the angles φi are not limited to these. Note that in reality, imaging devices do not exist in the case of rendering by CG; however, since images equivalent to those imaged by the imaging devices are generated, the angles φi are referred to as the angles φi of the imaging devices.

In FIG. 14, the usual presentation directions θi described with reference to FIG. 12 are also shown. It is possible to omit the usual presentation directions θi in the case where it is not necessary for the naked-eye stereoscopic display apparatus to present the parallax images in the usual presentation directions θi. Moreover, the angular regions where there is a high possibility that the eyes may be present and the angular region where there is a low possibility are shown in FIG. 14 for clarity.

The viewpoint adjustment unit 32 reads out, from the table holding unit 33, information indicating the angle φi corresponding to the parallax level Lpa inputted from the parallax level calculation unit 31. The viewpoint adjustment unit 32 inputs the readout information which indicates the angle φi, to the viewpoint image generation unit 34. Based on the inputted 3D object data and information indicating the angle φi, the viewpoint image generation unit 34 generates, by rendering, the parallax images of the nine viewpoints, in which the parallax between the adjacent viewpoint images in the angular regions where there is a high possibility that the left and right eyes may be present is reduced, and the parallax between the adjacent viewpoint images in the angular region where there is a low possibility that the left and right eyes may be present is increased.

Video data of the parallax images of the nine viewpoints, which are generated by the viewpoint image generation unit 34, is inputted to a drive unit 35. The drive unit 35 drives the display device 50 to assign the respective pixel data of the individual data portions, which compose the parallax images of the nine viewpoints in the inputted video data, to the respective pixels of the display device 50 of the nine viewpoints as shown in FIG. 1A, and to display the respective pixel data. In such a way, in accordance with the naked-eye stereoscopic display apparatus of this embodiment, even in the case of expressing greater depth and projection with respect to the surface of the display device 50, the deterioration of the resolution feeling can be suppressed, and it becomes possible to display the stereoscopic image with a high resolution feeling.

Now, by using FIG. 15, further description is made of the functions and the effects of this embodiment. In FIG. 15, the axis of abscissas represents the viewpoint number i, and the axis of ordinates represents the angle $\phi i$. The angle $\phi i$ is equivalent to the angle of the presentation direction of the parallax image. The regions where the viewpoint number i is 0 to 2 and 6 to 8 are regions where there is a high possibility that the left and right eyes may be present, and are portions corresponding to the angular regions $\theta lp$ and $\theta rp$. The region where the viewpoint number i is 3 to 5 is a region where there is a low possibility that the left or right eye may be present, and is the portion corresponding to the angular region $\theta np$.

As understood from FIG. 15, in the portions corresponding to the angular regions $\theta lp$ and $\theta rp$, variation of $\phi i$ with respect to a change of i becomes small. As the parallax level Lpa increases, the variation becomes smaller, and the gradient thereof becomes gentler. That is to say, as the parallax level Lpa increases, the parallax between the adjacent viewpoint images in the angular regions where there is a high possibility that the left or right eye may be present reduces, and the parallax between the adjacent viewpoint images in the angular region where there is a low possibility that the left or right eye may be present increases. In such a way, an improvement in the resolution feeling which corresponds to the extent of the parallax level Lpa, can be obtained. Note that, though the variation of $\phi i$ with respect to a change of i becomes large in the portion corresponding to the angular region $\theta np$, a problem is less likely to occur since this is the region where there is a low possibility that the left or right eye may be present.

The data to be inputted to the naked-eye stereoscopic display apparatus of this embodiment does not have to be the 3D object data rendered by CG, and may be the data imaged by the imaging devices as described with reference to FIG. 5, and in that case, the video data of the viewpoint images is generated by the processing method shown in FIG. 8. Moreover, the data concerned may be two viewpoint images, that is, so-called stereo contents, and in that case, as shown in FIG. 9, the video data of the viewpoint images is generated by the video signal processing device using a parallax map and the like.

<Second Embodiment of Naked-Eye Stereoscopic Display Apparatus and Viewpoint Adjustment Method>

Figures 16, 17:
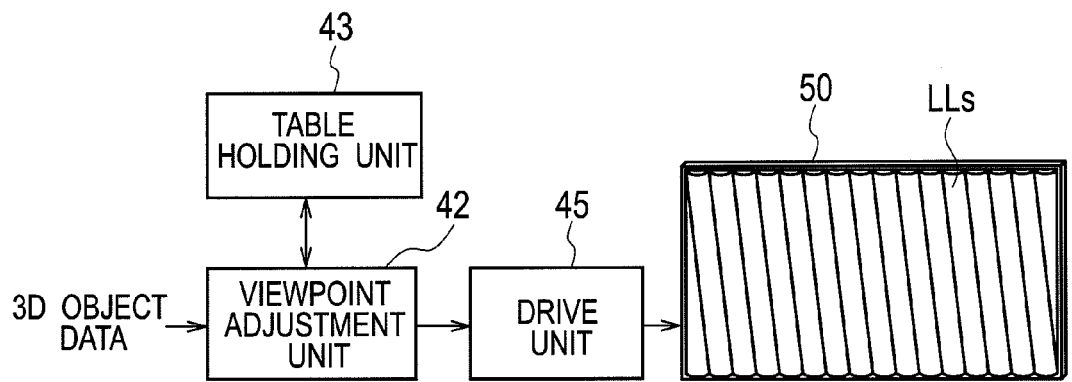
FIG. 16 is a block diagram showing a naked-eye stereoscopic display apparatus of the second embodiment.
FIG. 17 is a diagram showing an example of a presentation parallax image setting table held by a table holding unit 43 of FIG. 16.

FIG. 16 and FIG. 17 describe a second embodiment of the naked-eye stereoscopic display apparatus and the viewpoint adjustment method. In FIG. 16, the same reference numerals are assigned to the same portions as in FIG. 11, and a description thereof is omitted as appropriate. In FIG. 16, as an example, 3D object data of nine viewpoints is inputted to a viewpoint adjustment unit 42. In a table holding unit 43, a presentation parallax image setting table shown in FIG. 17 is held. As shown in FIG. 17, in the presentation parallax image setting table, corresponding numbers of the viewpoint images to be presented and the viewpoint numbers i are held.

The viewpoint adjustment unit 42 refers to the number of the viewpoint image to be presented by the table holding unit 43, and outputs a parallax image of the corresponding viewpoint number i. As understood from FIG. 17, if the viewpoint number i is 0, 1, 4, 7 and 8, then the corresponding parallax images of the viewpoint numbers 0, 1, 4, 7 and 8 are outputted. If the viewpoint number i is 2, then the parallax image of the viewpoint number 2 is not outputted, but the parallax image of the viewpoint number 1 is outputted. If the viewpoint number i is 3, then the parallax image of the viewpoint number 3 is not outputted, but the parallax image of the viewpoint number 2 is outputted. If the viewpoint number i is 5 and 6, then the parallax images of the viewpoint numbers 5 and 6 are not outputted, but the parallax images of the viewpoint numbers 6 and 7 are outputted. In this case, the parallax images 3 and 5 are not used.

A drive unit 45 drives the display device 50 to assign the respective pixel data of the individual data portions, which compose the parallax images in the inputted video data, to the respective pixels of the display device 50, and to display the respective pixel data.

In a similar way to the viewpoint adjustment unit 32 in FIG. 11, substantially, the viewpoint adjustment unit 42 of FIG. 16 also reduces the parallax between adjacent viewpoint images to be presented in the angular regions where there is a relatively high possibility that an eye may be present more than the parallax between adjacent viewpoint images to be presented in the angular region where there is a relatively low possibility that an eye may be present.

In accordance with the second embodiment, the same parallax images will be displayed in the regions where there is a high possibility that the left or right eye may be present. Accordingly, the parallax Pax as described with reference to FIG. 1B is eliminated, and the deterioration of the resolution feeling can be suppressed. In the region where there is a low possibility that the left or right eye may be present, the parallax Pax becomes large; however, a problem is less likely to occur here since this is the region where there is a low possibility that the left or right eye may be present. Also in the second embodiment, even in the case of expressing greater depth and projection with respect to the surface of the display device 50, the deterioration of the resolution feeling can be suppressed, and it becomes possible to display the stereoscopic image with a high resolution feeling.

<Third Embodiment of Naked-Eye Stereoscopic Display Apparatus and Viewpoint Adjustment Method>

FIG. 18 to FIG. 22, describe a third embodiment of the naked-eye stereoscopic display apparatus and the viewpoint adjustment method. In the above-mentioned first and second embodiments, as shown in FIG. 3A and FIG. 3B, it is premised that the observer sees the stereoscopic image from a direction perpendicular to the screen surface of the naked-eye stereoscopic display apparatus 100. However, the observer does not always see the stereoscopic image from a direction perpendicular to the screen surface. For example, when the observer's face is located in a position shifted from the center in the horizontal direction of the screen, but the observer looks at the center of the screen in the horizontal direction, the observer's viewing direction is shifted from a direction perpendicular to the screen surface.

Figure 18:
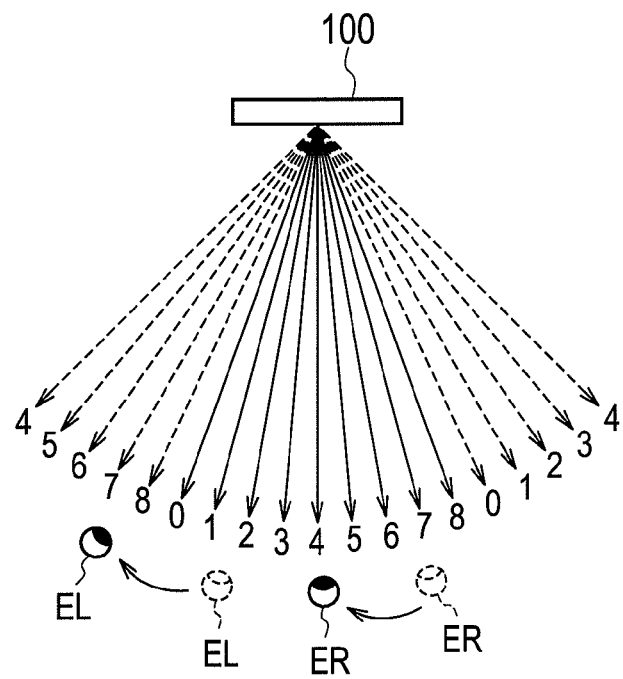
FIG. 18 is a view showing a state where the observer's eyes are offset from a direction perpendicular to the screen surface of the naked-eye stereoscopic display apparatus.

As shown in FIG. 18, the viewpoint images of the viewpoints 0 to 8 are presented bilaterally and symmetrically when viewed from the naked-eye stereoscopic display apparatus 100. If the right eye ER and left eye EL are located at positions shown by broken lines, then it is possible to visually recognize the stereoscopic image with comfort. But if the position of the observer's face is shifted to the left in FIG. 18, the positions of the right eye ER and the left eye EL are offset in the direction of the arrows. In this state, the left eye EL will recognize the viewpoint images shown by broken arrow lines, and accordingly, a pseudoscopic image is formed and the stereoscopic image cannot be visually recognized correctly. The same shall also apply to the case where the position of the observer's face is shifted to the right in FIG. 18.

Accordingly, it is desired that the stereoscopic image with a high resolution feeling be visually recognized even if the position of the observer's face is shifted in the horizontal direction and the line of sight is shifted from a direction perpendicular to the screen surface. The third embodiment meets this requirement.

Figure 19:
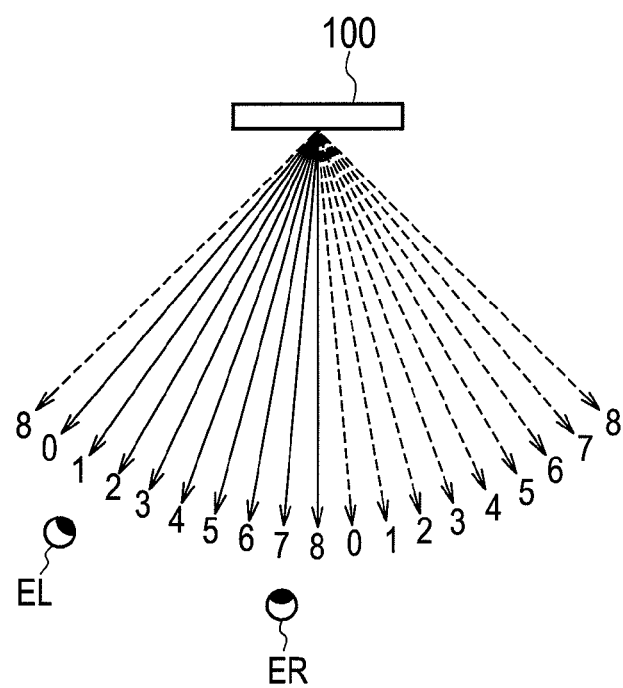
FIG. 19 is a view showing presentation directions of the viewpoint images, where a stereoscopic image can be visually recognized with comfort in the state of FIG. 18.

In the case where the right eye ER and the left eye EL are offset as shown in FIG. 18, if the viewpoint images of the viewpoints 0 to 8 are presented as shown in FIG. 19, the stereoscopic image can be visually recognized with comfort. It is defined that m%n gives the remainder obtained by dividing m by n. Thus, if the offset amount in the horizontal direction of the observer's face is $\Delta x$, then since the number of viewpoints in the example shown in FIG. 18 is nine, the position of the viewpoint i can be corrected as shown in FIG. 19 if a viewpoint image given by $(i+\Delta x)\%9$ is presented at the position of the viewpoint i.

Figure 20:
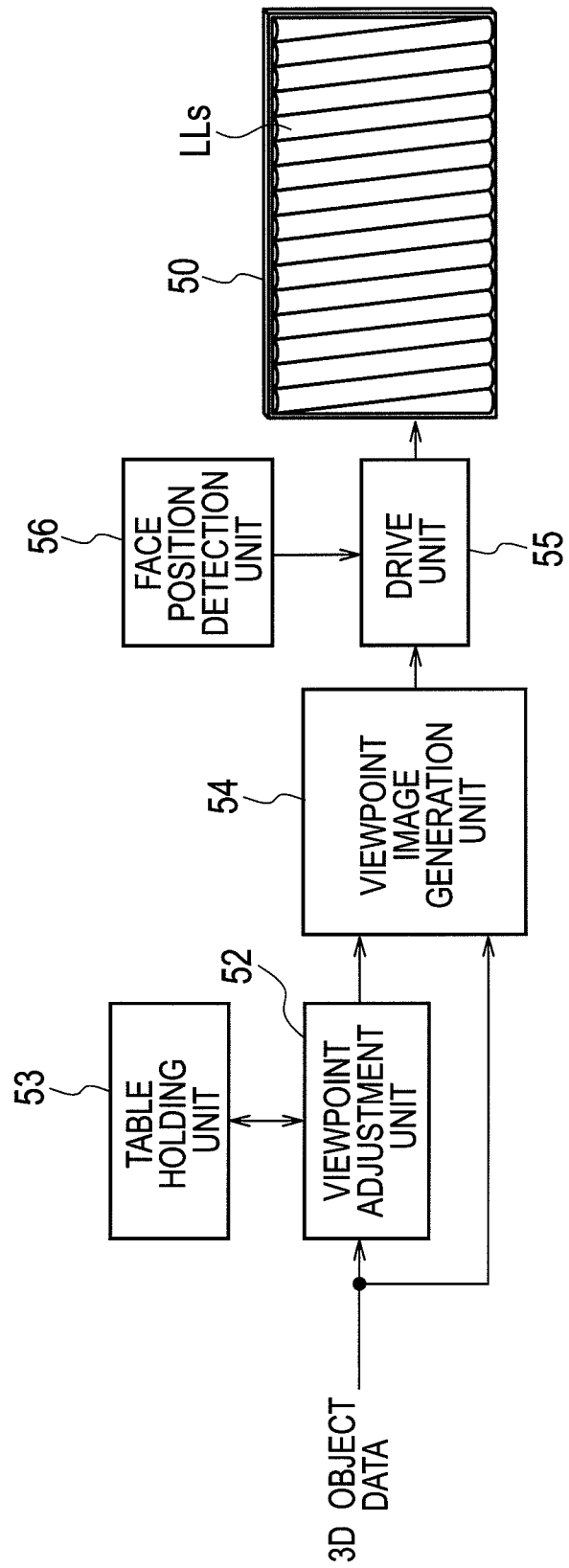
FIG. 20 is a block diagram showing a naked-eye stereoscopic display apparatus of a third embodiment.

FIG. 20 shows the third embodiment configured so as to correct the position of the viewpoint i based on the position of the observer's face. In FIG. 20, as an example, 3D object data of nine viewpoints is inputted to a viewpoint adjustment unit 52 and a viewpoint image generation unit 54. In a table holding unit 53, a parallax image presentation direction setting table shown in FIG. 21 is held.

Figures 21, 22:
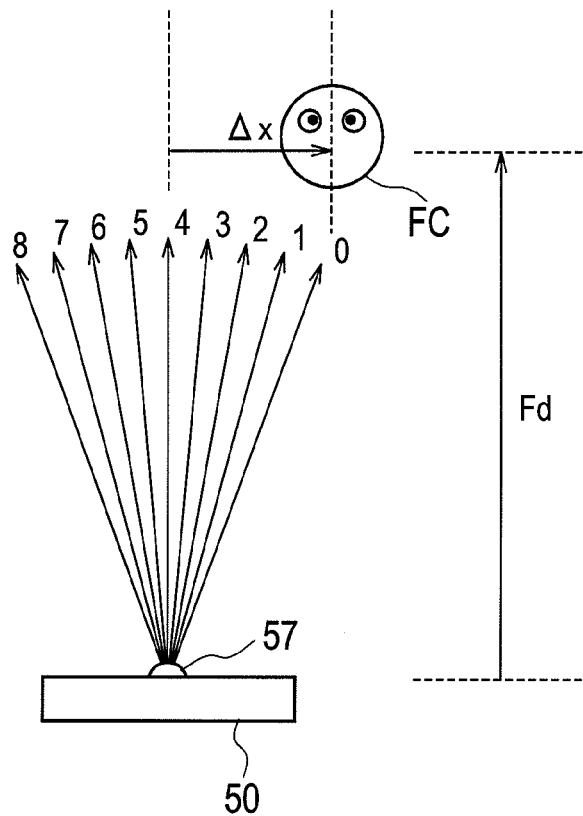
FIG. 21 is a diagram showing an example of a parallax image presentation direction setting table held by a table holding unit 53 of FIG. 20.
FIG. 22 is a diagram showing an example of a method of detecting a position of an observer's face.

As shown in FIG. 21, in the parallax image presentation direction setting table, there are set: the usual presentation direction θi in the event of rendering the 3D object; and the angle φi for reducing the parallax between the adjacent viewpoint images in the angular regions where there is a high possibility that the left or right eye may be present and increasing the parallax between the adjacent viewpoint images in the angular region where there is a low possibility that the left or right eye may be present.

In the case where it is not necessary for the naked-eye stereoscopic display apparatus to perform the presentation of the parallax image in the usual presentation direction θi, it is possible to omit the presentation direction θi. Also, for clarity, the angular regions where there is a high possibility that either eye may be present and the angular region where there is a low possibility are shown in FIG. 21.

The viewpoint adjustment unit 52 refers to the parallax image presentation direction setting table set in the table holding unit 53, and inputs, to the viewpoint image generation unit 54, information indicating the angle φi in correspondence with each viewpoint i of the 3D object data. Based on the inputted 3D object data and information indicating the angle φi, the viewpoint image generation unit 54 generates and renders parallax images of the nine viewpoints, in which the parallax between the adjacent viewpoint images in the angular regions where there is a high possibility that the left or right eye may be present is reduced, and the parallax between the adjacent viewpoint images in the angular region where there is a low possibility that the left or right eye may be present is increased. Video data of the parallax images of the nine viewpoints, which are generated by the viewpoint image generation unit 54, is inputted to a drive unit 55.

A face position detection unit 56 detects the position of the face of the observer who sees the stereoscopic image displayed on the display device 50. The face position detection unit 56 detects the position of a face FC, for example, as shown in FIG. 22. A camera 57 is provided on the center portion in the horizontal direction of the display device 50. The camera 57 may be embedded in a frame portion on the periphery of the screen, in a cabinet of the display device 50, or installed as a separate part on the upper portion of the cabinet. Note that, in FIG. 20, illustration of the camera 57 is omitted. The position of the face FC may be detected by an infrared sensor in place of the camera 57.

Based on a video imaged by the camera 57, the face position detection unit 56 detects the offset amount $\Delta x$ which indicates the amount that the face FC is offset from the center position in the horizontal direction. In the example of FIG. 22, while the center of the face FC was originally located at viewpoint 4, it has been offset to viewpoint 0, and the offset amount $\Delta x$ is four. The offset amount $\Delta x$ detected by the face position detection unit 56 is inputted to the drive unit 55. If the offset amount $\Delta x$ is 0, then as described with reference to FIG. 1A, the drive unit 55 drives the display device 50 to assign the respective pixel data of the individual data portions, which compose the parallax images of the nine viewpoints in the inputted video data, to the respective pixels of the display device 50 of the nine viewpoints, and to display the respective pixel data. If the offset amount $\Delta x$ is not 0, then in response to the value of the offset amount $\Delta x$, the drive unit 55 drives the display device 50 such that there is shift in the assigned position of the respective pixel data of the parallax images of the nine viewpoints on the display device 50.

FIG. 23 shows how to shift the viewpoint number i in the parallax image presentation direction setting table of FIG. 21 in the case where the offset amount $\Delta x$ is four. Viewpoint numbers i' indicate viewpoint numbers of the shifted pixel data corresponding to a value of four for $\Delta x$. As shown in FIG. 23, in the case where the face FC is offset as shown in FIG. 22, for example, the drive unit 55 drives the display device 50 to display the pixel data of viewpoint 0 to the position of the data of viewpoint 4 in FIG. 1A, and to display the pixel data of viewpoint 1 to the position of the pixel of viewpoint 5 in FIG. 1A.

In accordance with the third embodiment, even in the case where the position of the observer's face is shifted from the center position in the horizontal direction of the display device 50, and the stereoscopic image is not seen from a direction perpendicular to the screen surface, the stereoscopic image can be visually recognized with comfort. Moreover, the parallax between the viewpoint images is adjusted in each of the regions where there is a high possibility that the left or right eye may be present and also in regions where there is a low possibility, and accordingly, even in the case of expressing greater depth and projection with respect to the surface of the display device 50, the deterioration of the resolution feeling can be suppressed, and it becomes possible to display the stereoscopic image with a high resolution feeling.

<Fourth Embodiment of Naked-Eye Stereoscopic Display Apparatus and Viewpoint Adjustment Method>

A fourth embodiment shown in FIG. 24 is an embodiment configured so as to exert similar functions and effects to those of the third embodiment but by a configuration different from that of the third embodiment in FIG. 20. In FIG. 24, the same reference numerals are assigned to the same portions as in FIG. 20, and a description thereof is omitted as appropriate.

In FIG. 24, in the table holding unit 53, a parallax image presentation direction setting table shown in FIG. 25A is held. The offset amount $\Delta x$ detected by the face position detection unit 56 is inputted to a replacement unit 58. The replacement unit 58 reads out the parallax image presentation direction setting table of FIG. 25A. Then, in a similar way to FIG. 23, the replacement unit 58 replaces the viewpoint number i by the viewpoint number i' in response to the offset amount Δx inputted from the face position detection unit 56.

FIG. 25B shows a parallax image presentation direction replacement table, in which the viewpoint numbers i in the parallax image presentation direction setting table shown in FIG. 25A are replaced by the viewpoint numbers i', and the viewpoint numbers i' are arrayed in order 0 to 8. Also here, the case where the offset amount Δx is set at "four" is shown. The parallax image presentation direction replacement table newly generated by the replacement unit 58 shows the relationship between the viewpoint number i and the viewpoint number i', and in addition, the relationship between the viewpoint number i' and the angle ϕi.

The viewpoint adjustment unit 52 refers to the parallax image presentation direction replacement table generated by the replacement unit 58, changes each viewpoint i of the 3D object data to the viewpoint i', and inputs the information indicating the angle ϕi corresponding to the viewpoint i' to the viewpoint image generation unit 54. Based on the inputted 3D object data and information indicating the angle ϕi, the viewpoint image generation unit 54 generates the parallax images of the nine viewpoints, in which the parallax between the adjacent viewpoint images in the angular regions where there is a high possibility that the left or right eye may be present is reduced, and the parallax between the adjacent viewpoint images in the angular region where there is a low possibility that the left or right eye may be present is increased.

In a similar way to the first embodiment, as described with reference to FIG. 1A, the drive unit 55 drives the display device 50 to assign the respective pixel data of the individual data portions, which compose the parallax images of the nine viewpoints in the inputted video data, to the respective pixels of the display device 50 of the nine viewpoints, and to display the respective pixel data. That is to say, the drive unit 55 just needs to drive the display device 50 as usual irrespective of the offset amount Δx.

Also in the fourth embodiment, even in the case where the position of the observer's face is shifted from the center position in the horizontal direction of the display device 50, and the stereoscopic image is not seen from a direction perpendicular to the screen surface, the stereoscopic image can be visually recognized with comfort. Moreover, the parallax between the viewpoint images is adjusted in each of the regions where there is a high possibility that the left or right eye may be present and also in regions where there is a low possibility, and accordingly, even in the case of expressing greater depth and projection with respect to the surface of the display device 50, the deterioration of the resolution feeling can be suppressed, and it becomes possible to display the stereoscopic image with a high resolution feeling.

<Fifth Embodiment of Naked-Eye Stereoscopic Display Apparatus and Viewpoint Adjustment Method>

Figure 26:
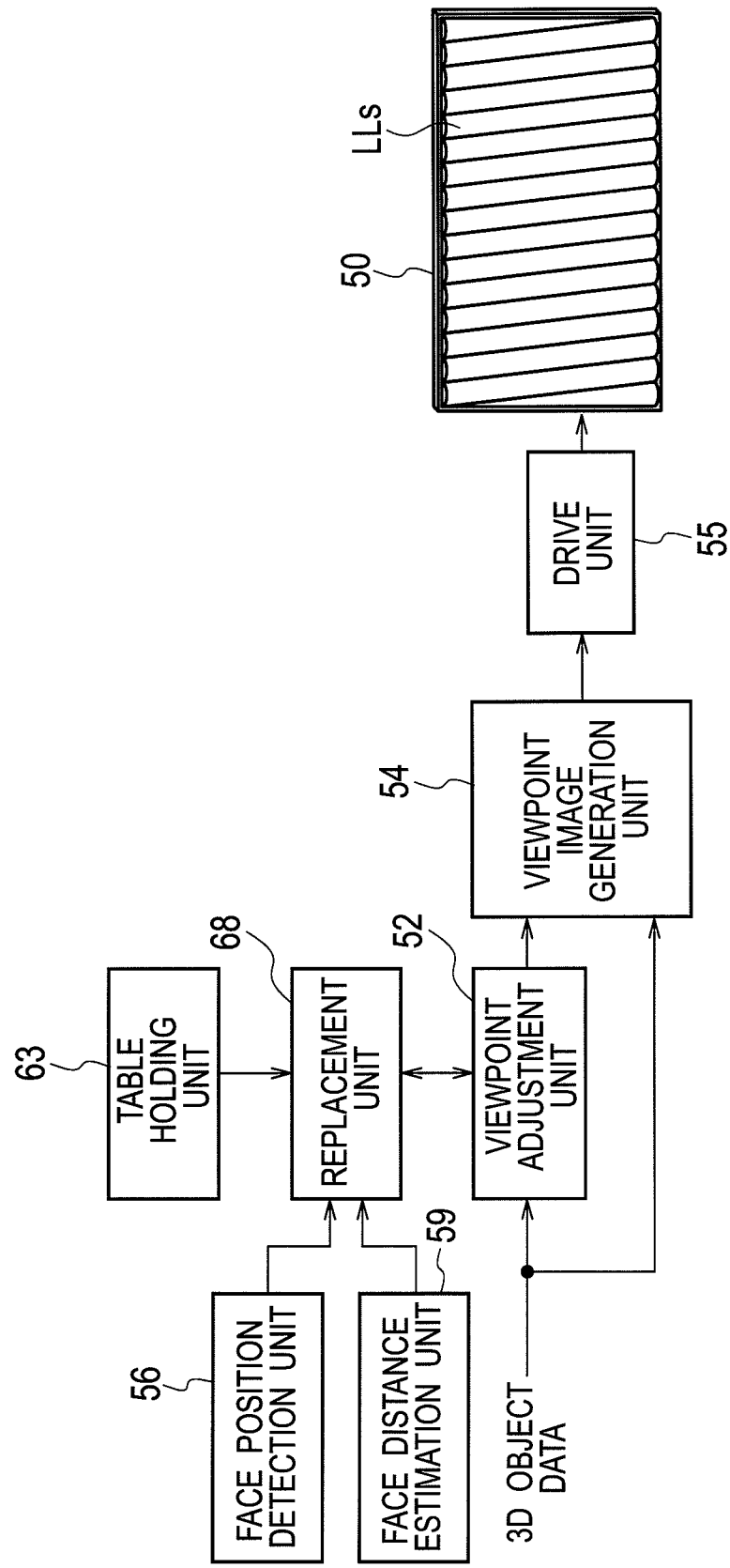
FIG. 26 is a block diagram showing a naked-eye stereoscopic display apparatus of a fifth embodiment.

In addition to the configuration of the fourth embodiment, a fifth embodiment shown in FIG. 26 is an embodiment configured so as to adjust the angle ϕi in response to the distance of the observer from the display device 50 when the observer is observing the stereoscopic image.

In FIG. 26, the same reference numerals are assigned to the same portions as in FIG. 24, and a description thereof is omitted as appropriate. In the case where the observer approaches the display device 50 and observes the stereoscopic image, the image is blurred intensely owing to the parallax, and the angular regions where there is a high possibility that the left or right eye may be present and the angular region where there is a low possibility are clearly distinguishable. However, in the case where the observer observes the stereoscopic image farther from the display device 50, the blurring of the image owing to the parallax is not so intense, and the distinction between the angular regions where there is a high possibility that the left or right eye may be present and the angular region where there is a low possibility becomes ambiguous.

In FIG. 26, a face distance estimation unit 59 estimates a distance Fd from the display device 50 to the face FC based on the size of the face FC as shown in FIG. 22. If the size of the face FC is determined, then it can be determined to some extent whether the face FC is getting nearer the display device 50 or farther therefrom. It is not necessary to accurately measure the distance Fd and accordingly, in the fifth embodiment, the size of the face FC is classified into a plurality of stages based on the video imaged by the camera 57, and the estimated distance Fd of the face FC from the display device 50. For example, the face distance estimation unit 59 classifies the distance Fd into three stages, which are: "large" in which the face FC is large distance from the display device 50; "small" in which the face FC is near to the display device 50; and "medium" as an intermediate between "large" and "small".

Distance estimation data indicating which of "large", "medium" or "small" has been detected for the distance Fd by the face distance estimation unit 59, is inputted to a replacement unit 658. A plurality of cameras 57 may be provided, the distance Fd may be accurately measured, and the distance Fd may be classified.

In the fifth embodiment, in the table holding unit 63, a parallax image presentation direction setting table shown in FIG. 27A is held. As shown in FIG. 27A, if the distance Fd is "large", then the angle ϕi is also set relatively large in the angular regions where there is a high possibility that the left or right eye may be present and relatively low in the angular region where there is a low possibility that the left or right eye may be present. If the distance Fd is "small", then the angle ϕi is also set relatively small in the angular regions where there is a high possibility that the left or right eye may be present. If the distance Fd is "medium", then the angle ϕi is set accordingly at an intermediate level between "large" and "small". In other words, the degree to which the angle ϕi is changed in both high and low probability regions is adjusted in response to the changing value of the distance Fd.

In a similar way to the fourth embodiment, the replacement unit 68 reads out the parallax image presentation direction setting table of FIG. 27A, and in response to the offset amount Δx inputted from the face position detection unit 56, replaces the viewpoint number i by the viewpoint number i' in a similar way to FIG. 23. FIG. 27B shows a parallax image presentation direction replacement table, in which the viewpoint numbers i in the parallax image presentation direction setting table shown in FIG. 27A are replaced by the viewpoint numbers i', and the viewpoint numbers i' are arrayed in order of 0 to 8. The parallax image presentation direction replacement table newly generated by the replacement unit 68 shows the relationship between the viewpoint number i and the viewpoint number i', and in addition, the relationship between the viewpoint number i' and the angle ϕi in the case where the distance Fd is each of "large", "medium" and "small".

The viewpoint adjustment unit 52 refers to the parallax image presentation direction replacement table generated by the replacement unit 68, changes each viewpoint i of the 3D object data to the viewpoint i', and inputs the information indicating the angle ϕi corresponding to the viewpoint i' to the viewpoint image generation unit 54. In response to the distance estimation data inputted from the face distance estimation unit 59, the replacement unit 68 supplies information indicating the angle ϕi, in which the distance Fd is any of "large", "medium" or "small", to the viewpoint adjustment unit 52. The information indicating the angle ϕi corresponding to the distance Fd is inputted to the viewpoint image generation unit 54. Operations of the viewpoint image generation unit 54 and the drive unit 55 are the same as those of the fourth embodiment.

In accordance with the fifth embodiment, in addition to the effects exerted by the fourth embodiment, there is the additional effect of adjusting the parallax between the adjacent viewpoint images in the angular regions where there is a high possibility that the left or right eye may be present in response to the changing distance of the observer from the display device 50 when the observer is observing the stereoscopic image, and of adjusting the parallax between the adjacent viewpoint images in the angular region where there is a low possibility that the left or right eye may be present in response to the same.

The above-described offset amount Δx and the above-described number of stages obtained by classifying the distance Fd are merely examples. The number of stages obtained by the classification may be two or four or more. Moreover, the number of viewpoints does not have to be nine points.

In the event of generating, by the above-mentioned naked-eye stereoscopic vision-ready video data generation method, the parallax images of the n viewpoints, in which the parallax between the adjacent viewpoint images in the regions where there is a high possibility that the left or right eye may be present is reduced and the parallax between the adjacent viewpoint images in the region where there is a low possibility that the left or right eye may be present is increased, then formatting the parallax images into a predetermined format, and generating the naked-eye stereoscopic vision-ready video data; it is also possible to detect the position of the observer's face in real time and to generate naked-eye stereoscopic vision-ready video data made to correspond to the position of the observer's face in the way outlined in the third to fifth embodiments of the naked-eye stereoscopic display apparatus and the viewpoint adjustment method.

As outlined in the respective examples of the naked-eye stereoscopic vision-ready video data generation method in FIG. 8 to FIG. 10, naked-eye stereoscopic vision-ready video data made to correspond to the position of the observer's face can be generated in real time. In the event of displaying the naked-eye stereoscopic vision-ready video data on the naked-eye stereoscopic display apparatus, the naked-eye stereoscopic vision-ready video data only needs to be generated in such a manner that, after the position of the observer's face in the horizontal direction of the naked-eye stereoscopic display apparatus is detected, the plurality of viewpoint images in which viewpoints are adjusted are shifted in correspondence with the detected position of the face and formatted into a predetermined format. In this case, the existing configuration may be adopted for the naked-eye stereoscopic display apparatus, and the naked-eye stereoscopic vision-ready video data in the predetermined format simply needs to be displayed.

As described above, in accordance with the respective embodiments, even in the case of expressing greater depth and projection with respect to the surface of the display device, the deterioration of the resolution feeling can be suppressed, and a stereoscopic image with a high resolution feeling can be displayed.

The present invention is not limited to the embodiments described above, and is changeable in various ways within the scope without departing from the spirit of the present invention. In these embodiments, the description is mainly made of the case of using the lenticular lens as the optical member; however, the optical member is not limited to the lenticular lens. However, the lenticular lens is preferable as the optical member.

Moreover, the angular regions where there is a high possibility that either eye may be present are defined to be two regions; however, it is also possible to divide the visual recognition range θvi more finely, and to set three or more regions as the angular regions where there is a high possibility that either eye may be present. Furthermore, in place of holding the tables in the table holding units 33, 43, and 53, functions may be held in advance therein, and the tables in FIG. 14, FIG. 17, FIG. 21, FIG. 25 and FIG. 27 may be realized by calculation using the functions.

What is claimed is:

1. A naked-eye stereoscopic display apparatus comprising:
a display device comprising a plurality of pixels arrayed in a horizontal direction and a vertical direction and a memory store for storing data representing the plurality of pixels, whereby the display device assigns respective pixels of video data composed of a plurality of viewpoint images to the plurality of pixels, thereby displaying the respective pixels of pixel data;
an optical light directing means comprising an optical member that has a plurality of optical elements periodically arrayed therein, arranged on the display device in a state where a periodic direction of the optical elements is inclined with respect to the horizontal direction of pixels in the display device, and configured to divide the plurality of viewpoint images displayed on the display device into a plurality of different viewpoint directions, and to present the divided viewpoint images; and
a viewpoint adjustment unit comprising a processor, the processor storing viewpoint adjustment data, receiving a parallax level derived from the plurality of viewpoint images, and which, within a maximum predetermined horizontal viewing angle defined by two viewpoint images with the largest parallax, defines a first horizontal angular region, comprising a left region in which there is a high possibility that a viewer's left eye may be present when observing the display device and a right region in which there is a high possibility that a viewer's right eye may be present when observing the display device, and a second horizontal angular region in which there is a low possibility that the viewer's left eye and the viewer's right eye may be present, and configured to reduce the parallax between adjacent viewpoint images displayed in the first horizontal angular region more than the parallax between adjacent images in the second horizontal angular region.

2. The naked-eye stereoscopic display apparatus according to claim 1, further comprising:
a holding unit that holds a table in which individual presentation directions of the viewpoint images to be presented in the first and second horizontal angular regions are set, or holds functions for calculating the individual presentation directions of the viewpoint images to be presented in the first and second horizontal angular regions,
wherein the viewpoint adjustment unit adjusts the viewpoints based on the table or functions held in the holding unit.

3. The naked-eye stereoscopic display apparatus according to claim 2, further comprising:

a parallax level calculation unit configured to calculate a parallax level of the video data, wherein the viewpoint adjustment unit adjusts the viewpoints so that, as the parallax level calculated by the parallax level calculation unit increases, the parallax between the adjacent viewpoint images of the viewpoint images to be presented in the first horizontal angular region is reduced.

4. The naked-eye stereoscopic display apparatus according to claim 3, wherein the viewpoint adjustment unit adjusts the viewpoints so that, as the parallax level calculated by the parallax level calculation unit increases, the parallax between the adjacent viewpoint images of the viewpoint images to be presented in the second horizontal angular region is increased.

5. The naked-eye stereoscopic display apparatus according to claim 3, wherein:

the holding unit holds a table, in which a plurality of sets of presentation directions is set, in correspondence with the parallax level calculated by the parallax level calculation unit, and in response to the parallax level calculated by the parallax level calculation unit, the viewpoint adjustment unit selects a suitable set from among the plurality of sets of presentation directions in the table, and adjusts the viewpoints based on the presentation directions of the selected set.

6. The naked-eye stereoscopic display apparatus according to claim 2, further comprising:

a face position detection unit configured to detect a position of a face of the observer in a horizontal direction of the display device when the observer is observing the video data displayed on the display device, wherein, in an event of assigning the respective pieces of pixel data to the plurality of pixels, the viewpoint adjustment unit changes assignment of pixels to which the pixel data are assigned, depending on the position of the face as detected by the face position detection unit.

7. The naked-eye stereoscopic display device according to claim 6, further comprising:

a drive unit configured to drive the display device to display the viewpoint images in which the viewpoints are adjusted by the viewpoint adjustment unit, wherein, in the event of displaying the viewpoint images in which the viewpoints are adjusted, on the display device as driven by the drive unit, the drive unit changes the pixels to which the respective pieces of pixel data are to be assigned.

8. The naked-eye stereoscopic display apparatus according to claim 6, further comprising:

a drive unit configured to drive the display device to display the viewpoint images in which the viewpoints are adjusted by the viewpoint adjustment unit; and a replacement unit configured to, in the event of displaying the viewpoint images in which the viewpoints are adjusted, on the display device by the drive unit, replaces relationships between the viewpoint images to be presented in the first and second horizontal angular regions and individual presentation directions of the viewpoint images in advance, the relationships being obtained from the holding unit, thus changing the pixels to which the respective pieces of pixel data are assigned.

9. The naked-eye stereoscopic display apparatus according to claim 8, wherein, in response to a change in distance between the display device and the observer's face, the extent of adjustment of both the parallax between the adjacent viewpoint images in the viewpoint images to be presented in the first horizontal angular region, and the parallax between the adjacent viewpoint images in the viewpoint images to be presented in the second horizontal angular region, are changed by the viewpoint adjustment unit.

10. The naked-eye stereoscopic display apparatus according to claim 9, wherein, as the distance between the display device and the observer's face reduces, the parallax between the adjacent viewpoint images in the viewpoint images to be presented in the first horizontal angular region is reduced.

11. A viewpoint adjustment method comprising:

a viewpoint adjustment unit comprising a processor, the processor storing viewpoint adjustment data, using the viewpoint adjustment data to adjust viewpoints so that a parallax between adjacent viewpoint images in a set of viewpoint images to be presented in a first horizontal angular region is adjusted, the first horizontal angular region comprising a left region in which there is a high possibility that a viewer's left eye may be present when observing a naked-eye stereoscopic display apparatus and a right region in which there is a high possibility that a viewer's right eye may be present when observing a naked-eye stereoscopic display apparatus, within a maximum predetermined horizontal viewing angle defined by two viewpoint images with the largest parallax; and the viewpoint adjustment unit using the viewpoint adjustment data to adjust viewpoints so that a parallax between adjacent viewpoint images in the viewpoint images to be presented in a second horizontal angular region is adjusted, the second horizontal angular region being a region at the center of the left region and the right region of the first horizontal angular region, in which there is a low possibility that the viewer's left eye and the viewer's right eye may be present when observing the naked-eye stereoscopic display apparatus, within the maximum predetermined horizontal viewing angle, wherein the parallax between adjacent viewpoint images in the first horizontal angular region is reduced more than the parallax between adjacent viewpoint images in the second horizontal angular region by the viewpoint adjustment unit.

12. The viewpoint adjustment method according to claim 11, further comprising using the viewpoint adjusting unit to adjust the viewpoints based on a table in which individual presentation directions of the viewpoint images to be presented in the first and second horizontal angular regions are set, or in which presentation directions are obtained by functions for calculating the individual presentation directions of the viewpoint images to be presented in the first and second horizontal angular regions.

13. The viewpoint adjustment method according to claim 12, further comprising:

using a parallax calculation unit to calculate a parallax level of the video data, and using the viewpoint adjustment unit to adjust the viewpoints so that, as the calculated parallax level increases, the parallax between the adjacent viewpoint images in the viewpoint images to be presented in the first horizontal angular region is reduced.

14. The viewpoint adjustment method according to claim 12, further comprising:

using a parallax calculation unit to calculate a parallax level of the video data, and using the viewpoint adjustment unit to adjust the viewpoints so that, as the calculated parallax level increases, the parallax between the adjacent viewpoint images in the viewpoint images to be presented in the second horizontal angular region is increased.

15. The viewpoint adjustment method according to claim 13,
wherein, the viewpoint adjustment unit refers to a table, in which a plurality of sets of the presentation directions is set, in correspondence with a plurality of the parallax levels, and
the viewpoint adjustment unit, in response to the calculated parallax level, selects a suitable set from among the plurality of sets of the presentation directions in the table, and adjusts the viewpoints based on presentation directions of the selected set.

16. The viewpoint adjustment method according to claim 12,
wherein the naked-eye stereoscopic display apparatus comprises a display device having a plurality of pixels arrayed in a horizontal direction and a vertical direction, whereby the display device assigns respective pixels of video data composed of a plurality of viewpoint images to the plurality of pixels, thereby displaying the respective pixels of pixel data, and
the viewpoint adjustment unit detects a position of a face of an observer in a horizontal direction of the naked-eye stereoscopic display apparatus when the observer is observing the video data displayed on the naked-eye stereoscopic display apparatus, and
a drive unit for driving the display device, in the event of assigning the respective pieces of pixel data to the plurality of pixels and displaying the pixel data on the display device, changes positions of pixels to which the pixel data are assigned, depending on the detected position of the face.

17. The viewpoint adjustment method according to claim 16, wherein, in the event of displaying the viewpoint images in which the viewpoints are adjusted, on the display device as driven by the drive unit, the drive unit changes the pixels to which the respective pieces of pixel data are to be assigned.

18. The viewpoint adjustment method according to claim 16, wherein, in the event of displaying the viewpoint images in which the viewpoints are adjusted, on the display device by the drive unit that drives the display device, a replacement unit replaces relationships between the viewpoint images to be presented in the first and second horizontal angular regions and individual presentation directions of the viewpoint images in advance, thus changing the pixels to which the respective pieces of pixel data are assigned.

19. The viewpoint adjustment method according to claim 18, wherein, in response to a distance between the display device and the observer's face, the viewpoint adjustment unit varies the extent of adjustment of both the parallax between the adjacent viewpoint images in the viewpoint images to be presented in the first horizontal angular region, and the parallax between the adjacent viewpoint images in the viewpoint images to be presented in the second horizontal angular region.

20. The viewpoint adjustment method according to claim 19, wherein, as the distance between the display device and the observer's face reduces, the viewpoint adjustment unit reduces the parallax between the adjacent viewpoint images in the viewpoint images to be presented in the first horizontal angular region.

21. A naked-eye stereoscopic vision-ready video data generation method comprising:
using an imaging device or rendering graphics by using a computer to set, within a maximum predetermined viewing angle defined by two viewpoint images with the largest parallax, a first horizontal angular region comprising a left region in which there is a high possibility that an observer's left eye may be present when an observer observes a naked-eye stereoscopic display apparatus and a right region in which there is a high possibility that an observer's right eye may be present when the observer observes a naked-eye stereoscopic display apparatus, and a second horizontal angular region in the center of the left region and the right region where there is a low possibility that the observer's left eye and the observer's right eye may be present, and generating viewpoint images in which viewpoints are adjusted in advance so that a parallax between adjacent viewpoint images in viewpoint images to be presented in the first horizontal angular region is reduced more than a parallax between adjacent viewpoint images in viewpoint images to be presented in the second horizontal angular region; and
using a formatting device to format the viewpoint images, in which the viewpoints are adjusted in advance, into a predetermined format, and generating naked-eye stereoscopic vision-ready video data.

22. The naked-eye stereoscopic vision-ready video data generation method according to claim 21, wherein an interval among a plurality of imaging devices which image the plurality of viewpoint images is adjusted, and the parallax between the adjacent viewpoint images in each of the first and second horizontal angular regions is adjusted, whereby the adjusted viewpoint images are generated.

23. The naked-eye stereoscopic vision-ready video data generation method according to claim 21,
wherein the plurality of viewpoint images are imaged while setting the interval among the plurality of imaging devices at an equal interval, and
by using a video signal processing device, based on imaging signals of the plurality of viewpoint images, viewpoint images are generated in which viewpoints are adjusted so that the parallax between the adjacent viewpoint images in the viewpoint images to be presented in the first horizontal angular region is reduced more than the parallax between the adjacent viewpoint images in the viewpoint images to be presented in the second horizontal angular region.

24. The naked-eye stereoscopic vision-ready video data generation method according to claim 21,
wherein parallax images of two viewpoints are imaged by using two imaging devices, and
by using a video signal processing device, based on imaging signals of the imaged parallax images of the two viewpoints, a plurality of viewpoint images is generated in which viewpoints are adjusted so that the parallax between the adjacent viewpoint images in the viewpoint images to be presented in the first horizontal angular region is reduced more than the parallax between the adjacent viewpoint images in the viewpoint images to be presented in the second horizontal angular region.

25. The naked-eye stereoscopic vision-ready video data generation method according to claim 21, wherein, by rendering by computer graphics, a plurality of viewpoint images is generated in which viewpoints are adjusted so that the parallax between the adjacent viewpoint images in the viewpoint images to be presented in the first horizontal angular region is reduced more than the parallax between the adjacent viewpoint images in the viewpoint images to be presented in the second horizontal angular region.

26. The naked-eye stereoscopic vision-ready video data generation method according to claim 23, further comprising:
in the event of displaying the naked-eye stereoscopic vision-ready video data on the naked-eye stereoscopic display apparatus, using a face position detection unit to detect a position of a face of the observer in a horizontal direction of the naked-eye stereoscopic display apparatus, and using a video signal processing device to generate the naked-eye stereoscopic vision-ready video data after the plurality of viewpoint images is shifted in correspondence with the detected position of the face.

27. The naked-eye stereoscopic vision-ready video data generation method according to claim 24, further comprising:

in the event of displaying the naked-eye stereoscopic vision-ready video data on the naked-eye stereoscopic display apparatus, using a face position detection unit to detect a position of a face of the observer in a horizontal direction of the naked-eye stereoscopic display apparatus, and using a video signal processing device to generate the naked-eye stereoscopic vision-ready video data after the plurality of viewpoint images is shifted in correspondence with the detected position of the face.

28. The naked-eye stereoscopic vision-ready video data generation method according to claim 25, wherein, in the event of displaying the naked-eye stereoscopic vision-ready video data on the naked-eye stereoscopic display apparatus, using a face position detection unit to detect a position of a face of the observer in a horizontal direction of the naked-eye stereoscopic display apparatus, and using a video signal processing device to generate the naked-eye stereoscopic vision-ready video data after the plurality of viewpoint images is shifted in correspondence with the detected position of the face.

* * * * *